(12) United States Patent
Round et al.

(10) Patent No.: US 7,831,548 B1
(45) Date of Patent: Nov. 9, 2010

(54) SYSTEMS AND METHODS THAT USE SEARCH QUERIES TO IDENTIFY RELATED LISTS

(75) Inventors: Matthew J. Round, Mercer Island, WA (US); Jeffrey P. Bezos, Greater Seattle, WA (US); Ryan J. Snodgrass, Kirkland, WA (US); Jeremy C. York, Bothell, WA (US); Russell A. Dicker, Seattle, WA (US); Joanna L. Power, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1583 days.

(21) Appl. No.: 10/262,609

(22) Filed: Sep. 30, 2002

Related U.S. Application Data

(60) Provisional application No. 60/343,664, filed on Oct. 24, 2001, provisional application No. 60/367,649, filed on Mar. 25, 2002.

(51) Int. Cl.
   *G06F 17/30* (2006.01)
(52) U.S. Cl. .................. 707/609; 707/723
(58) Field of Classification Search ............ 707/1–10, 707/100–104.1, 200–205, 609, 723
   See application file for complete search history.

(56) References Cited

U.S. PATENT DOCUMENTS

| | | | |
|---|---|---|---|
| 5,583,763 | A | 12/1996 | Atcheson et al. |
| 5,640,553 | A | 6/1997 | Schultz |
| 5,749,081 | A | 5/1998 | Whiteis |
| 5,790,426 | A | 8/1998 | Robinson |
| 5,796,395 | A | 8/1998 | de Hond |
| 5,802,515 | A | 9/1998 | Adar et al. |

(Continued)

FOREIGN PATENT DOCUMENTS

WO    WO 99/41694    8/1999

(Continued)

OTHER PUBLICATIONS

J., Hibbard, "Just Add People—Collaborative filtering brings human input to information retrieval in the enterprise," Journal ISSN: 8750-6874, printed on Jun. 6, 2002.

(Continued)

*Primary Examiner*—Shahid A Alam
(74) *Attorney, Agent, or Firm*—Knobbe, Martens, Olson & Bear, LLP

(57) ABSTRACT

Information retrieval systems and methods are disclosed for presenting items of interest to a user of a computer-based data repository, where the items are presented in the form of lists generated by other users. Users of a data repository may generate lists of items from the repository that are accessible by other users. In various embodiments, users generating lists may add supplemental commentary about the items and other personalizing information. The information retrieval systems and methods store the user-generated lists for future presentation to other users. When a user of the data repository submits a search query, items returned in the query's results are interpreted to be items of interest to the user, and in response, one or more lists determined to be similar to the items of interest are presented to the user.

23 Claims, 17 Drawing Sheets

U.S. PATENT DOCUMENTS

| | | | |
|---|---|---|---|
| 5,983,219 | A | 11/1999 | Danish et al. |
| 5,987,446 | A | 11/1999 | Corey et al. |
| 5,991,756 | A | 11/1999 | Wu |
| 6,041,311 | A | 3/2000 | Chislenko et al. |
| 6,177,942 | B1 | 1/2001 | Keong et al. |
| 6,185,558 | B1 | 2/2001 | Bowman et al. |
| 6,266,649 | B1 | 7/2001 | Linden et al. |
| 6,397,219 | B2 * | 5/2002 | Mills ............................. 707/10 |
| 6,418,429 | B1 * | 7/2002 | Borovoy et al. ................. 707/3 |
| 6,529,911 | B1 * | 3/2003 | Mielenhausen ............. 707/100 |
| 6,629,097 | B1 * | 9/2003 | Keith ............................. 707/5 |
| 6,668,255 | B2 * | 12/2003 | Mielenhausen ............. 707/100 |
| 7,003,504 | B1 * | 2/2006 | Angus et al. ..................... 707/1 |
| 7,159,011 | B1 * | 1/2007 | Knight et al. ............... 709/207 |
| 2001/0021914 | A1 | 9/2001 | Jacobi et al. |
| 2002/0019856 | A1 | 2/2002 | Bezos et al. |
| 2002/0143296 | A1 | 10/2002 | Russo |
| 2002/0156423 | A1 | 10/2002 | Tollini |
| 2004/0260569 | A1 * | 12/2004 | Bell et al. ....................... 705/1 |

FOREIGN PATENT DOCUMENTS

| | | |
|---|---|---|
| WO | WO 00/62223 | 10/2000 |
| WO | WO 01/42880 A3 | 6/2001 |
| WO | WO 02/19203 A2 | 3/2002 |
| WO | WO 02/42977 A2 | 5/2002 |

OTHER PUBLICATIONS

H., Kautz, B., Selman and M., Shah, "Referral Web: Combining Social Networks and Collaborative Filtering,", Communications of the ACM, vol. 40, No. 3, dated Mar. 1997.

P., Patton, "Buy Here, and We'll Tell You What You Like," E-Commerce, The New York Times, dated Sep. 22, 1999.

B., Mobasher, R., Cooley and J., Srivastava, "Automatic Personalization Based on Web Usage Mining," Communications of the ASCM, vol. 43, No. 8, pp. 143-151, dated Aug. 2000.

N., Wang, "Keep in Touch: New Breed of Site Links People by Common Interest," Internet.com, pp. 1-5, dated Nov. 10, 1997.

M., Roscheisen, C., Mogensen and T., Winograd, "Beyond browsing: shared comments, SOAPs, trails, and on-line communities," Computer Networks and ISDN Systems 27 pp. 739-749, 1995.

M., Balabanovic and Y., Shoham, "Fab: Content-Based, Collaborative Recommendation," Communications of ACM (1997).

L., Terveen, W. Hill, B., Amento, D., McDonald and J., Creter, "Phoaks: A System for Sharing Recommendations," Communications of the ACM, vol. 40, No. 3, pp. 59-62, dated Mar. 1997.

Schafer et al., "E-Commerce Recommendation Applications," Data Mining and Knowledge Discovery, vol. 5, Nos. 1-2, Jan. 2001, pp. 115-153.

* cited by examiner

File  Edit  View  Go  Favorite  Help

🛒 VIEW CART | WISH LIST | YOUR ACCOUNT | HELP

WELCOME | NINA'S STORE | BOOKS | ELECTRONICS | MUSIC | DVD | KITCHEN & HOUSEWARES | COMPUTERS | ▶ SEE MORE STORES

▶ INTERNATIONAL | ▶ TOP SELLERS | ▶ FRIENDS & FAVORITES | ▶ FREE E-CARDS | ▶ FRIDAY SALE

Listmania > Preview

Here's a preview of your list:

If everything looks good click the Publish this list button. Otherwise click the Edit button to make changes.

A Short List for Technical Writers by Nina Brandt, fan of clarity and simplicity ( Edit ) OR ( Publish this list )

1. The Elements of Style
   by William Strunk Jr., et al

Nina Brandt's comments:
   Been around a long time, but still jolts us into taking another look at our writing 2. The Levels of Edit
   by Robert Van Buren, Mary Fran Buehler

Nina Brandt's comments:
   Not all edits are equal

3. Bug in Writing Revised: A Guide to Debugging Your Prose
   by lyn dupre

Nina Brandt's comments:
   My favorite -- so funny, human, and INTELLIGENT

4. Human Factors for Technical Communicators
   by Marlana Coe

Nina Brandt's comments:
   Rule #1 of technical writing: keep the needs of your audience in mind at all times!

( Edit ) OR ( Publish this list )

You're not finished until you click the Publish this list button.

SYSTEMS AND METHODS THAT USE SEARCH QUERIES TO IDENTIFY RELATED LISTS

PRIORITY CLAIMS

The present application claims priority benefit under 35 U.S.C. 119(e) from U.S. Provisional Application No. 60/343,664, filed Oct. 24, 2001, entitled INFORMATION RETRIEVAL SYSTEMS AND METHODS THAT USE USER-DEFINED LISTS TO IDENTIFY RELATED OFFERINGS and from U.S. Provisional Application No. 60/367,649, filed Mar. 25, 2002, entitled SYSTEMS AND METHODS THAT USE SEARCH QUERIES TO IDENTIFY RELATED LISTS, both of which are hereby incorporated herein by reference in their entirety.

The present application is related to the co-pending and commonly owned U.S. Patent applications having the following titles, each of which was filed on even date herewith:
1. U.S. patent application Ser. No. 10/262,587, filed on Sep. 30, 2002 entitled INFORMATION RETRIEVAL SYSTEMS AND METHODS THAT USE USER-DEFINED LISTS TO IDENTIFY RELATED OFFERINGS
2. U.S. patent application Ser. No. 10/262,603, filed on Sep. 30, 2002 entitled SYSTEMS AND METHODS FOR IDENTIFYING RELATED LISTS BASED ON LIST ACCESS
3. U.S. patent application Ser. No. 10/262,518, filed on Sep. 30, 2002 entitled SYSTEMS AND METHODS FOR IDENTIFYING RELATED LISTS BASED ON ONLINE ACTIVITY Each of the above referenced patent applications is incorporated herein by reference in its entirety.

BACKGROUND OF THE INVENTION

1. Field of the Invention

The present invention relates to information filtering and data mining. More specifically, the invention relates to technologies for extracting relevant information regarding the opinions of other users for presentation to a current user.

2. Description of the Related Art

Over the past several decades, advances in many aspects of computer technology, including enhanced capabilities for processing, storing, and networking digital data, have vastly increased the amounts and types of information available to the general public. For example, a repository of information for use by international camping enthusiasts includes descriptions of hundreds of thousands of campsites and hiking trails. A database of medical journal articles holds millions of articles. One popular online search engine is now able to access over 150 million visual images for display to viewers. Often, the problem for users of such systems is not how to access information on a desired topic, but how to sort through, how to make sense of, and how to become familiar with the huge amounts of data available. System administrators often strive to provide enjoyable ways for users to take best advantage of the data available to them, while minimizing the difficulty and frustration involved.

Similarly, with the increasing popularity of the Internet and the World Wide Web, it has also become common for online stores to set up websites and other types of interactive telecommunications systems for marketing and selling goods from online catalogs that can comprise millions of products. One problem facing online stores, and especially those with extensive product lines, is the challenge of encouraging users who are viewing a product catalog or other repository of information to stay at the site, to browse widely through the available products, and to make a purchase. Unlike proprietors of so-called "brick and mortar" establishments, administrators of online systems have very few techniques at their disposal for creating an inviting environment that encourages users to stay at the site, to interact with other users, and to look at the descriptions of a variety of products.

At the same time, users at such online stores face the challenge of making informed purchases in spite of the fact that they cannot physically inspect the products via the website and typically cannot talk to a salesperson. One way that online stores seek to assist users with this challenge is by presenting product reviews, written either by professional reviewers or by other users. Typically, two shortcomings exist with such product reviews from the point of view of the users: (1) the user has little basis upon which to judge the relevance of the reviewer's opinion other than the content of the review itself, and (2) reviews are generally displayed for products that the user has already selected for display, and thus do not lead the user to other products of potential interest.

An online merchant or other system administrator can also seek to assist users by recommending items that the merchant believes will be of interest to the user. Such recommendations typically suggest items that have been found to be statistically similar to the merchant's conception or profile of the user's interests. One shortcoming of current recommendation systems is that reliable recommendations generally cannot be generated for a user until an accurate profile has been developed of the user's interest. Systems with these requirements are typically not flexible enough to provide recommendations for users with no such profile or to accommodate a user's short-term needs, such as when investigating a new research topic or gift shopping for someone very different than themselves.

Another shortcoming of recommendation systems is that, as is the case with product reviews, users have no way to judge the relevance of the recommendation to themselves. Statistical recommendations, whether based on a similarity metric of content analysis or the purchase histories of other users or some other metric, cannot provide the compelling force of a recommendation from another human being with known similar or interesting preferences.

In addition to the problem of making informed purchases online, users often find online shopping environments to be impersonal and unfriendly and to lack opportunities for human interaction, for participation, and for self-expression. Similar problems face the users of other types of large repositories of information. Repository administrators who wish to provide these experiences in order to encourage users to make frequent and satisfying use of their systems generally have few techniques at their disposal by which to do so.

SUMMARY OF THE INVENTION

These and other problems are addressed by a list system that allows users (known in this capacity as "list-makers") to create lists in which they can share their opinions, preferences, experiences, or other information related to a repository of data with other users. For example, a list-maker who accesses a database of camping information could make a list of the best trails for viewing fall foliage or the most dog-friendly campgrounds to share with other campers; a list-maker at a library website could create a list of favorite literature-based fantasy worlds to share with other readers; a list-maker at a repository of articles published by academic computer science journals might create a list of the most promising new data mining techniques or articles reflecting the best research methodologies to share with other students and researchers.

The list system stores these lists for future presentation to other users (known in this capacity as "viewers," although the presentation may be made aurally or by other means) as appropriate to the viewer's needs. The list system assesses the current interests or needs of a viewer as he or she accesses a data repository and selects lists that the system determines may be of current interest based on this assessment. For example, the list system might take note that a user had searched the camping repository for information on campsite reservations in New England, and, based on that fact, might present the user with lists that relate to New England created by other campers. The library's list system might take note that a user had searched for books by Roger Zelazny, or had previously checked out books by Isaac Asimov, and, based on that information, might present lists related to science fiction and fantasy topics. The list system might note that a researcher had printed out several of the articles mentioned in the list of best methodologies and might present the list to the researcher as being of possible interest. By choosing to read the lists presented, viewers willingly expose themselves to the list items and to any commentaries provided by the list-makers, as well as to links to further information about the list items, if links are included in the lists.

As will be described in greater detail below, the list system disclosed in this application allows users to share their opinions and experiences and also to explore and benefit from what other users have shared. To a certain extent, the system can foster a positive attitude towards the environment of the list system, a sense of community amongst a group of users, as well as a greater awareness of the items associated with the list system.

As will become clear in the description to come, the list system is particularly well suited and useful for online merchant enterprises. Users who go to a conventional online merchant's site often find that several elements of a "normal" shopping experience are missing. Typically, there is no chance to interact with other customers about the products in the store, no chance to share opinions and experiences regarding the products, and a much limited opportunity to browse the shelves for interesting items. The list system disclosed herein addresses these deficiencies in part and can encourage a user to browse more extensively within an online store and to consider purchasing products that may have been previously unknown to the user.

The various aspects of the list system set forth herein may be embodied within a wide range of multi-user computer-based systems, including systems in which information is conveyed to users by synthesized voice or on wireless devices and systems in which a special client or browser plug-in monitors a user's Web activities and makes appropriate suggestions. However, aspects of the list system may also be used within a normal, "brick-and-mortar" establishment in service of the same goals. For example, the list-generation-and-selection aspects of the system may be used to display lists to users upon checking out of a physical store. Thus, it should be understood that the HTML-Web-site-based implementations described herein illustrate just one type of system in which the inventive aspects of the list system may be used.

Similarly, the list system is particularly well-suited for settings where the items included in the lists are products or other items that may be purchased, such as, for example, videos, computer software, books, tools, gift items, or any of many other types of products. Although the items in many of the various example embodiments described below are items that are available for purchase, a skilled artisan will recognize that the disclosed technologies are also applicable to other types of items such as restaurants, chat rooms, events, websites, authors, services, opinions, offerings, items not available for purchase, other information, and so on. Therefore, the use of the term "product" throughout this disclosure is to be taken as an example of one possible type of list item, and not to limit the scope of possible list item types.

The list system will be described herein within the context of an online merchant website. In order to facilitate the use of the merchant website as an example to illustrate the implementation and use of the inventive technologies described herein, definitions are provided here for several relevant terms. Throughout the description, the term "product" will be used to refer generally to (a) an item that may be included in a list, or (b) its record, description, or product identification number within a database (for example, a Sony Walkman or its identifier within a products database). Throughout the description, the term "list" will be used to refer generally to (a) a representation of a list's contents in their entirety or in part, or to (b) a link to such a representation of the list. The term "detail page" describes a display, such as a Web page, that predominantly contains information about a particular product or other item. Each product detail page typically comprises a description, picture, and price of the product, customer reviews of the product, lists of related products, and information about the product's availability. The term "session" refers generally to the time span and the online activity that takes place between the time that a user enters or first accesses a website and the time that the user exits the website. This definition may optionally be expanded, for example, in order to encompass such scenarios as a user who initiates a session, then follows a link to one or more external sites, and finally returns to the online store within a predefined time period. The term "shopping cart," within the context of online shopping, refers to a data set or structure representing items currently selected by a user for prospective purchase. In most of the embodiments throughout this description, items and lists of items are described as being "relevant" if they are judged by the system to be similar to the perceived current needs and/or interests of the user. However, in other embodiments, the list system can also be implemented to identify "relevant" items or lists, where the term "relevant" can take on other meanings as they suit the needs of the system.

In one embodiment, one aspect of the list system allows list-makers to create lists of items that are both available for purchase at an online store and that the list-maker finds useful, interesting, preferred, or otherwise worthy of being included in a list to be shared with other users. Such lists are created by list-makers for purposes of self-expression and for the entertainment and/or informational benefit that they provide to viewers of the lists. For example, users of an online bookstore might want to create lists of the best bedtime stories they've ever read to their children, or of the how-to books they found most helpful in renovating their older home, or the books that have been most influential in their lives.

In one embodiment, list-makers have few restrictions on their choice of items to add to a list, and the list items can be selected freely from among the items available for purchase at the site. Any of these items in any combination may be included in a list that a user creates. It is not required that a list-maker has purchased the items at the merchant website or that the user even owns the items at all. For example, a list-maker could create a list of videos that he or she is hoping to view over the coming summer. Similarly, a list-maker could make a list of "essentials" for gardeners that comprises gardening tools, gardening books, and herbal aromatherapy bubble bath for relaxing after a hard day in the garden. The logic behind the grouping of items in a list is left to the list-maker. Beyond these restrictions, users can be left free to add items to their lists as they see fit.

In one embodiment, in addition to the actual choice of items to include in their lists, list-makers may also personalize the lists in a number of ways and may thereby use them as a vehicle for self-expression. In one embodiment, list-makers may give each list a title of their own choice. Even this small element of the system provides a means for self-expression. Lists of books on gardening can have titles such as, "Must Own Gardening Books for Chicago Gardeners," "Getting Started Gardening," or "Inspirational Books for the Downtrodden Gardener."

In one embodiment, list-makers may provide a brief self-description that gives viewers some sense of who the list-maker is and what may be his or her "qualifications" for making such a list. For example, a list entitled, "Top Ten Movies of the Year 2001" may appeal differently to viewers depending on the self-description provided by the list-maker, for example, "18-Year-Old Video Store Clerk," "Seattle online film critic," "Human rights activist," or "Monty Python Devotee."

In one embodiment, list-makers can personalize their lists by providing a brief commentary about each item. For example, list-makers can add commentary such as "The author weaves and allows you to experience the intensity, sorrow, beauty of his father's family" or "I still get chills" or "This second book is far more exciting than the first of the series." Because these lists typically express the enthusiasm of real users rather than the marketing strategies of merchants, they have the potential to be far more compelling to other users.

These and other possible technologies for personalizing lists serve both the list-makers and the viewers. List-makers are provided with avenues for self-expression at a depth that is not typically available in online business environments, or, for that matter, in most face-to-face business environments. Viewers may find the lists entertaining and instructional to read in their own right. In addition, viewers may feel an affinity to the list-maker of a list based on the glimpses of the list-maker's personality that are revealed in the list title, the self-description, the items chosen for inclusion into the list, the item commentaries, and any other similar elements, and may appreciate being exposed to the items on the list-maker's list.

The lack of restriction in list contents that was described above and the opportunities made available for list customization together help to provide one of the interesting, useful, and innovative aspects of the list system described herein, namely, what could be called its element of "focussed randomness." Unlike recommendation systems statistically based on content similarity or on an average of behaviors over a large number of users, lists provide links to a set of products that are deemed by one list-maker to be related to one another and to be of interest. Thus, to continue with one of the examples cited above, a user who has chosen to view the list entitled, "Essentials for Gardeners" because of an interest in gardening tools and books may be unexpectedly led to consider purchasing bubble bath. Such "focussed randomness" is preferable in the context of merchant recommendations to "true randomness," which could be implemented by displaying a link to an item from the merchant's product catalog that has been selected completely at random, possibly by a computer system. Thus, to a reader of the "Essentials for Gardeners" list, an unfamiliar link to an herbal aromatherapy beauty product may reasonably be expected to have a higher likelihood of interest than would an unexpected link to a high-tech desk lamp or a book on international finance. What gives the list items, including any unknown, unexpected, or seemingly random items, their potential appeal to viewers is not only their inclusion in a list that the viewer has chosen to read, but also the possibilities that are provided for the viewer to get a sense that he or she knows something about the list-maker, as has been described above.

The list system also provides technologies for selectively displaying subsets of the stored lists in response to the viewers' perceived current needs and interests. In one embodiment, once a list-maker submits a list to the list system, the list is entered into a repository database of lists. In one embodiment, as viewers browse a website, they are presented, on a portion of their display screen, with links to a subset of lists from the repository that the system has identified as being of possible immediate interest to the viewer, based on the viewer's current or past online activities. For example, in one embodiment, if a user chooses to view the detail page for a specific book, links to lists that contain that book or similar items can be presented to the user in one part of the detail page's screen display. In this way, the viewer can choose to look at the lists that have been presented by the system and can see what other items of interest might be found there. For example, a user who chooses to access the detail page for a book entitled *Gardening for Dummies* may be presented with lists entitled, "Flower Power," "First-time Homeowner's Essentials," and "Ways to Cover Up Big Holes in Your Yard," all of which contain the *Gardening for Dummies* book or similar items.

In one embodiment, the list system uses one or more technologies to identify lists that are assumed to be related to the user's current interests. Most of these technologies involve first identifying a set of one or more "indicator" items that the system assumes are of current interest to the user, and then locating lists that contain the indicator item(s).

Typically, actions such as clicking on a link, submitting a search query, navigating through the sections of the website, or one of a number of other possible online browsing activities may indicate a change of interests on the part of a user. In one embodiment, items directly associated with these online browsing activities are known as "source items" and are used by the list system as "indicator items" to help locate lists that will potentially be of interest to the user. In one embodiment, "indicator items" comprise both the "source items" and other items that are deemed by the system to be "similar" to the "source items", as will be described in greater detail below.

The system suitably updates its store of current "source items" on an ongoing basis in response to online activity. Using current online activity to identify "source items" helps the system to select lists that are highly correlated to the current short-term interests of the user. For example, if the user is currently searching for a Father's Day gift and is examining detail pages for books on woodworking for prospective purchase, the system will present lists that contain items which are similar to those being viewed and which may be relevant to the user's current online needs.

Various technologies for identifying relevant lists will now be described, initially with the simplifying assumption that the "indicator" items used as a basis for selecting relevant lists for display to a viewer are "source items." Subsequently, a broader definition of "indicator items" will be described which comprises both "source items" and "similar items" and which allows for the selection of lists that comprise source items or similar items or some of both. The source item identifying technologies may be implemented using either definition of indicator items.

As mentioned above, one technology for identifying a source item involves taking note of the item when a user chooses to view a detail page for a specific item. In one embodiment, the list system then assumes that the item is of current interest to the user and identifies it as being an indicator item for locating relevant lists for current display to the user. For example, when a user chooses to view a detail page for a pair of garden clippers, links to lists that contain that source item, namely the garden clippers, can then be presented to the user in a portion of the detail page screen display.

In one embodiment, another technology for identifying source items involves noting the results when a user submits a query to the site's search engine. The items returned to the user as search results, or a subset of these results, can be assumed by the system to be of current interest to the user. In this case, all of the items in the selected subset of search results are identified as source items for locating relevant lists. For example, if a user submits a search query on the search term "hammocks" and the search results comprise links to the detail pages of three hammocks available for purchase on the website, then the list system can display links to lists containing any of these hammocks on a portion of the search results page, possibly preferring lists that contain the largest number of the hammocks.

In one embodiment, when a user selects a link to a list, the list is displayed, including list items and other associated information. In one embodiment, the list system makes the assumption that if a user has elected to view a list, then the items on that list may potentially be of interest and can be used as source items for locating additional lists. Thus, when a link to a list is selected, in addition to presenting the selected list in full, the list system also uses part of the display screen, or other presentation medium, to present links to other lists that comprise some of the same items.

This technology for using the items on a list as source items for identifying additional lists allows the system to build upon the fact that list-makers are free to include any items of their choice into a list, including items that may seem different in subject matter or type from the other list items. For example, viewing a list that comprises mostly gardening books and tools, but also comprises a book entitled "Cooking From Your Vegetable Garden", may cause a link to be presented for a list that is mostly about cooking, if the two lists have one or more items in common. Similarly, viewing a list that is mostly about cooking and that comprises a book entitled "Cooking with Wine" may cause a link to be presented for a list that comprises kitchen items and gifts that have grape design motifs, including the same "Cooking with Wine" book. Viewing a list that comprises the "Cooking with Wine" book could lead to a list of many books about wine, and that list could lead to a list that comprises books about the personal lives of the Presidents, including several presidential biographies and one book entitled "Favorite Wines of the Presidents." Thus, a user who originally chose to view information about a specific hedge trimming tool for the garden may notice the lists displayed with the hedge trimmer's detail page and may be led by attraction and interest to view a sequence of other lists, eventually learning about other available gardening tools, gardening books, cookbooks, kitchen tools, gifts with grape motifs, and biographies of the Presidents. From the point of view of the user, this behavior can be seen as resembling a stroll through a shop while scanning items that attract interest on the various shelves. From the point of view of an online merchant, this behavior on the part of the user can be seen as very advantageous to short-term and long-term sales prospects.

The above-mentioned technologies for identifying source items rely on the user's online browsing activity as the source of those source items. Other technologies for identifying source items exist as well. For example, in one embodiment, when a user first enters a merchant website and has not yet generated any current online activity from which the list system can identify source items for list selection, the list system can draw on the user's stored purchase history, if one exists and is accessible, to identify previously purchased items that can be used as source items for list selection. Additionally, in one embodiment, a user may explicitly request to see the lists created by a specific list-maker. In this case, lists are selected based on list author rather than on the presence of indicator items.

In one embodiment of the list system, the indicator items used for list selection are not limited to source items, as was described above. If the system has access to information about items that are "similar" to the source items, then both the source items and the similar items may be included in the set of "indicator items," and the list system may display lists that comprise either any of the source items or any of the items that are "similar" to the source items, or some of each. The set of indicator items can thus be seen as being a set of "expanded" source items. For example, a person who chooses to view the detail page for a book entitled "Square Foot Gardening" may be presented with links not only to lists that contain the book "Square Foot Gardening" itself, but also to lists that contain books that the system as identified as being similar to "Square Foot Gardening", such as "Low-Maintenance Gardening" or "How To Win At Gardening".

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

These and other features of the embodiments of invention will now be described with reference to the drawings summarized below. These drawings and the associated description are provided to illustrate specific embodiments of the invention, and not to limit the scope of the invention

FIG. 4 illustrates the general configuration of a Web page that presents a list preview form to a user desiring to create a list.

FIG. 16 illustrates the general configuration of a Web page that presents a set of lists to a user who has clicked on a page based on the user's viewing activity during the current viewing session.

DETAILED DESCRIPTION OF THE PREFERRED EMBODIMENTS

To facilitate a complete understanding of the list system, the remainder of the detailed description describes the list system with reference to the figures, wherein like elements are referenced with like numerals throughout. Although the list system is described below in the context of a website, it will be recognized that the system may also be incorporated into an online services network, an interactive television system, a system in which customers browse an electronic catalog using in-store terminals, or other type of interactive system.

System Configuration

Figure 1:
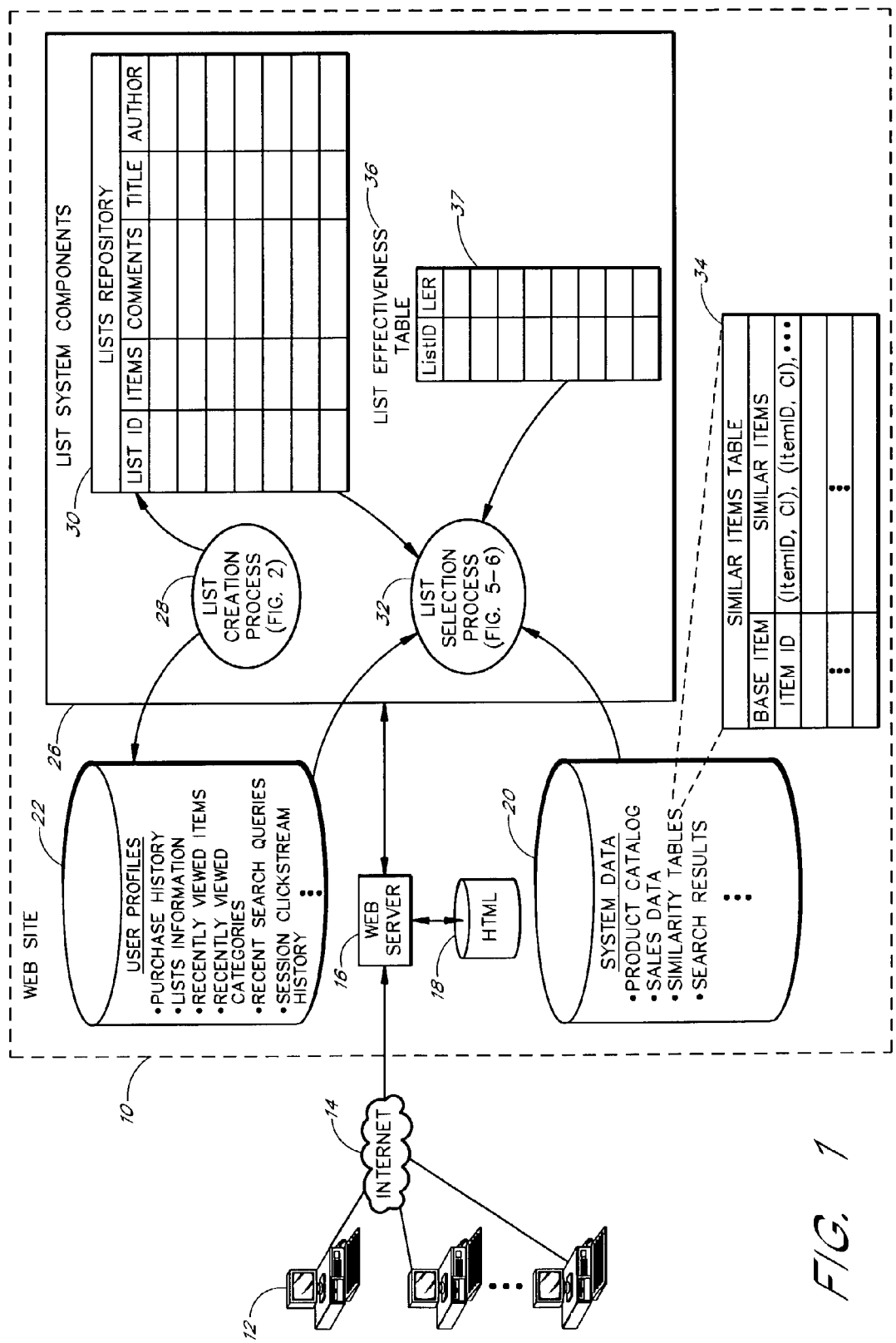
FIG. 1 illustrates a website which implements a system, comprising a list creation process and a list selection process, that operates in accordance with an embodiment of the invention.

FIG. 1 depicts one embodiment of a website 10 that implements the list system. The arrows in FIG. 1 show the general flow of information that is used by the list system. A skilled artisan will recognize that FIG. 1 is not intended to limit the large number of potential configurations of website components encompassed by the list system.

As illustrated by FIG. 1, computer users 12 access the website 10 via the Internet 14. The website 10 comprises a Web server application 16 ("Web server") which processes HTTP (Hypertext Transfer Protocol) access requests received over the Internet 14. The Web server 16 comprises one or more processors, and the processors comprise, by way of example, computers, program logic, or other substrate configurations representing data and instructions, which operate as described herein. In other embodiments, the processors can comprise controller circuitry, processor circuitry, processors, general purpose single-chip or multi-chip microprocessors, digital signal processors, embedded microprocessors, microcontrollers and the like. The Web server 16 accesses a database 18 of HTML (Hypertext Markup Language) content, which comprises product detail pages and other browsable information about various items of the catalog.

The website 10 also comprises a database of user profiles 22, also known as a personal profiles database, which stores account-specific information about users 12 of the site. Because a group of individuals can share an account, a given "user" from the perspective of the website may represent multiple actual users. As illustrated by FIG. 1, the profile data 22 stored for each user 12 may comprise one or more of the following types of information, among other types: (a) the user's purchase history, including dates of purchase; (b) information about the lists created by the user (if any); (c) a history of items recently viewed by the user; (d) a history of categories recently viewed by the user; and (e) a history of recent searches completed by the user.

As depicted by FIG. 1, the website 10 comprises a "system data" database 20 which stores various types of information about products available for purchase on the website 10 and processes that use the information. As illustrated by FIG. 1, the stored system data 20 may comprise one or more of the following types of information, as well as other information: (a) a product catalog of information regarding items available for purchase at the website 10, (b) sales data for the website 10, (c) similar items tables 34, as will be described in greater detail below, and (d) information about the results of search queries posed to the search engine. The website 10 may also include search functionality to allow users to interactively search the products catalog for particular items.

One aspect of the invention relies on technologies for identifying items that are similar to one another. The notion of "similarity" may be defined in a variety of ways with respect to the list system 26. In one embodiment, items in the products catalog are categorized. Books, as an example, may be categorized by subject matter, by author, by publisher, or by any one or more of a number of characteristics. Data stored about an item in the products catalog may comprise information about one or more categories to which the item belongs. For example, a book about Thomas Jefferson may be categorized as belonging to the categories of "U.S. History" and "Biographies." The same book may also belong to the category of "Books written by Stephen Ambrose." In one embodiment of the list system, items within a given category are deemed to be "similar" to one another. In one embodiment, sets of categories are deemed to be similar to one another, and items in any one of the categories may be deemed to be "similar" to items in any of the other categories of the set.

U.S. Pat. No. 6,317,722 and U.S. patent application Ser. Nos. 09/821,712 and 09/821,826 disclose technologies for identifying items that are similar to one another and are incorporated herein by reference. In one embodiment, user actions that evidence users' interests in, or affinities for, particular items are recorded for subsequent analysis. These item-affinity-evidencing actions may include, for example, the purchase of an item, the viewing of an item's detail page, and/or the addition of an item to an online shopping cart. To identify items that are related or "similar" to one another, a table generation component of the website analyzes the histories of item-affinity-evidencing actions of a community of users, preferably on a periodic basis, to identify correlations between items for which such actions were performed. For example, in one embodiment, user-specific purchase histories are analyzed to identify correlations between item purchases. That is, products A and B are considered to be similar because a significant number of those who bought A also bought B. In one embodiment, product viewing histories of users are recorded and analyzed to identify items that tend to be viewed in combination. For example, products A and B are judged to be similar because a significant number of those who viewed A also viewed B during browsing sessions. In such an embodiment, that do not belong to a common category may be deemed to be "similar." For example, if a significant number of recent website customers who purchased a given gardening book also purchased a popular dieting book, then, in one embodiment, the gardening book and the dieting book may currently be deemed to be "similar."

The results of the above process are preferably stored in one or more tables 34 that map each individual item to a set of similar items. Such tables of similar items can be based on various definitions of similarity and can be used for the list system disclosed herein, as well as for making recommendations to users, and for other uses. In one embodiment, for each reference, or base, item, a table may store a list of the N items deemed most "similar" to the reference item. The table may also store, for each pair of similar items, a score indicating the predicted degree of relatedness, often called a commonality index (CI), between the two items. The table is preferably generated periodically, for example, daily or weekly, using a most recent set of purchase history data, product viewing history data, and/or other types of historical browsing data reflecting users' item interests.

In one embodiment, a high commonality index means that two items are strongly correlated, while a low commonality index means that the two items are weakly correlated. For example, a relatively high commonality index for a pair of items ITEM A and ITEM B indicates that a relatively large percentage of users who bought ITEM A also bought ITEM B (and vice versa). A relatively low commonality index for ITEM A and ITEM B indicates that a relatively small percentage of the users who bought ITEM A also bought or viewed ITEM B (and vice versa). As described below, the similar items lists are generated, for each base item by selecting the N other items that have the highest commonality index values with respect to the base item.

As indicated above, the commonality index (CI) values are measures of the similarity between two items, with larger CI values indicating greater degrees of similarity. In one embodiment, the CI values are generated such that, for a given base item, the respective CI values of the corresponding similar items take into consideration both (a) the number of customers that are common to both items, and (b) the total number of customers of the two items. One method for generating the CI values is set forth in equation (1) below, where $N_{common}$ is the number of users who purchased both A and B, sqrt is a square-root operation, $N_A$ is the number of users who purchased A, and $N_B$ is the number of users who purchased B.

$$CI(item\_A, item\_B) = N_{common}/sqrt(N_A \times N_B) \quad \text{Equation (1)}$$

Because this equation is symmetrical (i.e., CI(item_A, item_B)=CI(item_B, item_A)), it is not necessary to separately calculate the CI value for every location in the table 34. In other embodiments, an asymmetrical method may be used to generate the CI values.

In the similar items table 34 in FIG. 1, each row corresponds to one item from the merchant's product catalog, which is called the base item 35 and which is listed by its itemID identifier. For each base item, the similar items table 34 may store a list of the N items deemed most "similar" to the base item according to a given similarity metric. For a given base item, each similar item that is identified is listed as an ordered pair, (itemID, CI), where itemID refers to an identifier for the product, and CI is the "commonality index" that conveys the degree to which the similar item is similar to the base item. In one embodiment, the commonality index is a number ranging from 0 to 100, with higher numbers signifying a greater perception of similarity on the part of the system.

As depicted by FIG. 1, the Web server 16 communicates with the components of the list system 26. The components may advantageously be configured to execute on one or more processors. The components include, but are not limited to: software or hardware components, modules such as software modules, object-oriented software components, class components and task components, processes, methods, functions, attributes, procedures, subroutines, segments of program code, drivers, firmware, microcode, circuitry, data, databases, data structures, tables, arrays, and variables.

The list system components 26 comprise a list creation process 28, a list selection process 32, and supporting data structures, such as a list repository 30 and a list effectiveness table 36. The term "process" is used herein to refer generally to one or more code modules that are executed by a computer system to perform a particular task or set of related tasks. The list creation process 28 and the list selection processes 32 of the list system may run, for example, on one or more Unix or NT based workstations or physical servers (not shown) of the website 10, and may be replicated across multiple machines to accommodate heavy loads.

The list creation process 28 allows users of the system to create lists, as will be described in greater detail below with reference to FIG. 2. When the list creation process 28 is complete, a newly-created list is stored in the list repository 30, and information regarding the list is provided to a user profile of the list-maker, stored in the database of user profiles 22.

The lists repository 30 comprises the lists created by all users 12 of the list system 26. In the illustration of FIG. 1, each row of the lists repository 30 contains information about one list. In the embodiment shown in FIG. 1, information about a list comprises: (a) a unique ListID identifier, (b) a list of items included in the list, preferably designated by the items' itemID identifiers, (c) comments that the list-maker has chosen to add about any of the items, (d) a title that the list-maker has created for the list, and (e) the name and self-description of the list-maker. The list repository may additionally comprise other information about the lists of the list system 26, or may omit some of the information described herein.

The list selection process 32, which will be described in greater detail with reference to FIGS. 5-11 below, selects and displays lists to a user. To do so, in one embodiment, the process 32 identifies source items that are assumed to exemplify a user's current online needs by receiving information regarding the user's session clickstream history (for example, the recent history of pages viewed on the website), purchase history, or other relevant information from the user profile 22. The list selection process 32 uses the source items received from the user profile 22 to identify lists from the list repository 30 that are judged to be the most relevant to the user's current needs. The list system 26 instructs the Web server 16 to display the selected lists in the Web page sent back to the user 12 via the Internet 14.

In order to expand the range of lists identified for display to the user 12, in one embodiment, the list selection process 32 can also refer to a similar items table 34 from the system data database 20 to find items that are similar to the source items. In this embodiment, both source items from the user profiles 22 and similar items from the system data 20 are used to indicate current user 12 interests and to identify lists of possible interest from the lists repository 30.

In order to increase the likelihood that a user will make a purchase during a session, in one embodiment, the list selection process 32 can also refer to a "list-effectiveness" table 36 that ranks each list based on the comparative frequency with which users who viewed the list went on to make a purchase or to place an item in their shopping cart. In one embodiment, the list effectiveness table 36 is based on clickstream and purchase history information collected during the normal course of operations for the website 100. In another embodiment, a user who views a list is given the opportunity to indicate whether the list is useful. For example, a "Yes/No" button can be provided. Periodically, the "Yes/No" or other similar ratings can be compiled, and associated effectiveness ratings can be applied to the lists. "Effectiveness" rankings for the lists may be stored in the list repository 30, in a separate table of list rankings 36, as depicted in FIG. 1, or in some other appropriate data structure. In one embodiment, because the relative "effectiveness" of the lists in the list system 26 is assessed off-line, re-ranking based on "effectiveness" may be accomplished more quickly and efficiently.

The list selection process 32 can use the information in the "list-effectiveness" table 36 to manipulate the order in which selected lists are displayed to a user 12, so that lists that have shown a relatively high statistical correlation with subsequent user purchases, or other desired activity, can be displayed earlier or more prominently than lists that show little such correlation. In the embodiments described in detail below, the items of known interest are identified based on the user's online activity or information stored in the user's profile.

List Creation Process

The general sequence of steps that are performed by the list creation process 28 to allow a user 12 to create a list of items will now be described with reference to FIG. 2. This process description, and the more specific implementations of the process components depicted in the example screenshots of FIGS. 3 and 4, described below, are intended to illustrate, and not to limit, the scope of the list system.

The list creation process 28 is preferably invoked in response to an online action of a user 12 in which the user 12, who is in contact with the Web server 16 via the Internet 14, indicates a desire to create a list. The Web server 16 contacts the list system 26, which invokes the list creation process 28.

Figure 2:
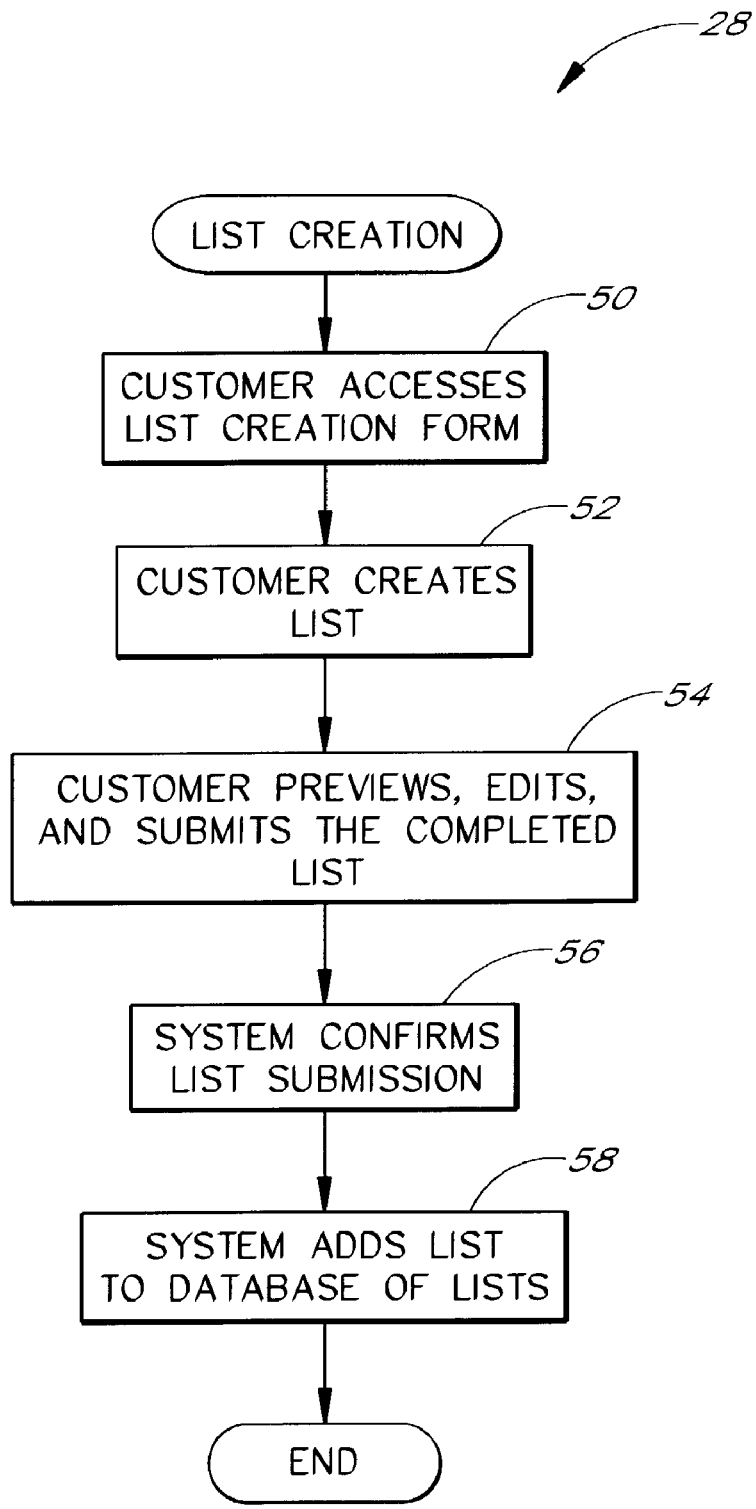
FIG. 2 illustrates a sequence of steps that are performed by a user in conjunction with one embodiment of the list creation process of FIG. 1 to create a new list.

As illustrated by FIG. 2, in the first step 50 of the list creation process 28, the user 12, who is acting in this capacity as a list-maker, accesses a list-creation form provided by the process 28. In step 52, the list-maker creates the list by filling out the list-creation form. In one embodiment, the process 28 allows the list-maker to provide a title for the list and/or a brief self-description that can help future readers of the list assess the list's relevance to their needs. For example, a list-maker wishing to create a list of helpful books on gardening might entitle the list, "Best Beginning Gardening Books" and might provide the self-description, "Perennial beginner." As another example, a list-maker might create a list entitled, "Must Reads for Technical Writers" and might provide the self-description, "Document manager, author, technical editor, 10 years experience."

The list-maker creates the body of the list by entering identifying information into the list-creation form for the items that the list-maker wishes to include in the list. In one embodiment, the items available for purchase at the website 10 are assigned identification numbers (itemIDs) or some other means of identification, and a list-maker can include items in a list by entering the associated itemIDs into the list-creation form. In one embodiment, where some or all of the list items are books, the identification numbers can be the International Standard Book Numbers (ISBNs) commonly assigned by publishers. In one embodiment, the Universal Product Code (UPC) number identifiers or bar codes commonly used by retail merchants can be used as itemIDs In one embodiment, titles or other word descriptions of items can be used instead of identification numbers.

In one embodiment, the list-creation form may provide the list-maker with space to add a short commentary about each item in the list. For example, a list-maker who lists a book entitled, "Introduction to Permaculture" might add the following commentary, "I am so inspired by the idea of permaculture, and this book is a great introduction and overview."

The list-creation form may also provide opportunity for the list-maker to include additional information, such as personal ratings of the list items, date of last reading or viewing of the list items, whether the list-maker recommends purchasing the items, or any other information.

In step 54, the list-maker previews, edits, and submits the completed list. In one embodiment, the list is displayed to the list-maker for preview using item titles rather than itemIDs in order to help the list-maker more easily verify that the correct items have been included in the list. In one embodiment, in order to more easily verify that the correct items have been included in the list, the list is displayed for preview using some or all of the following information for the list items: (a) the title, (b) the author, (c) a graphic image of the item, (d) a link to the item's detail page, and (e) the list-maker's 12 commentary that was entered for the item into the list-creation form. The list-maker has the opportunity to edit any entries made on the list-creation form before submitting the completed list. In one embodiment, the list-maker may also access the list after an original submission in order to make a later edit to the list.

In step 56, the process 28 confirms submission of the list. In step 58, the process 28 adds the new list to the list repository 30, and ends.

Figure 3:
FIG. 3 illustrates the general configuration of a Web page that presents a list-creation form to a user desiring to create a list.

The general form of a Web page that provides such a list-creation form 60 is shown in FIG. 3. A first form field 70 allows the list-maker to enter a title for the list. A second form field 72 allows the list-maker to enter a brief self-description. A third set of form fields 74 provides space to enter itemIDs for the items to be included in the list. A fourth set of form fields 76 provides space for the list-maker to enter brief commentary about each list item. The list-maker can select a "preview" button 78 to view a preview of the list before submission of the list. The list-maker can also select various links 80 provided on the Web page in order to access further information about various aspects of the list display system 26 and the list creation process 28.

The general form of a Web page that provides a list preview 82 before list submission is shown in FIG. 4. The list preview 82 displays the list title and self-description 84 entered by the list-maker in the list-creation form 60. The list preview 82 also displays the list items 90 that the list-maker included in the list. In the embodiment shown in FIG. 4, the list items are books, and each item is identified by its title, author, and, if available, a graphic image of its cover. In addition, the title of an item included in the list preview 82 provides a link 91 to the detail page for the item. The list preview page 82 additionally provides an "edit" button 86, which the list-maker may select to edit the list, and a "publish the list" button 88, which the user 12 may select if the list is ready for submission to the list repository 30.

List Selection Process

Figure 5:
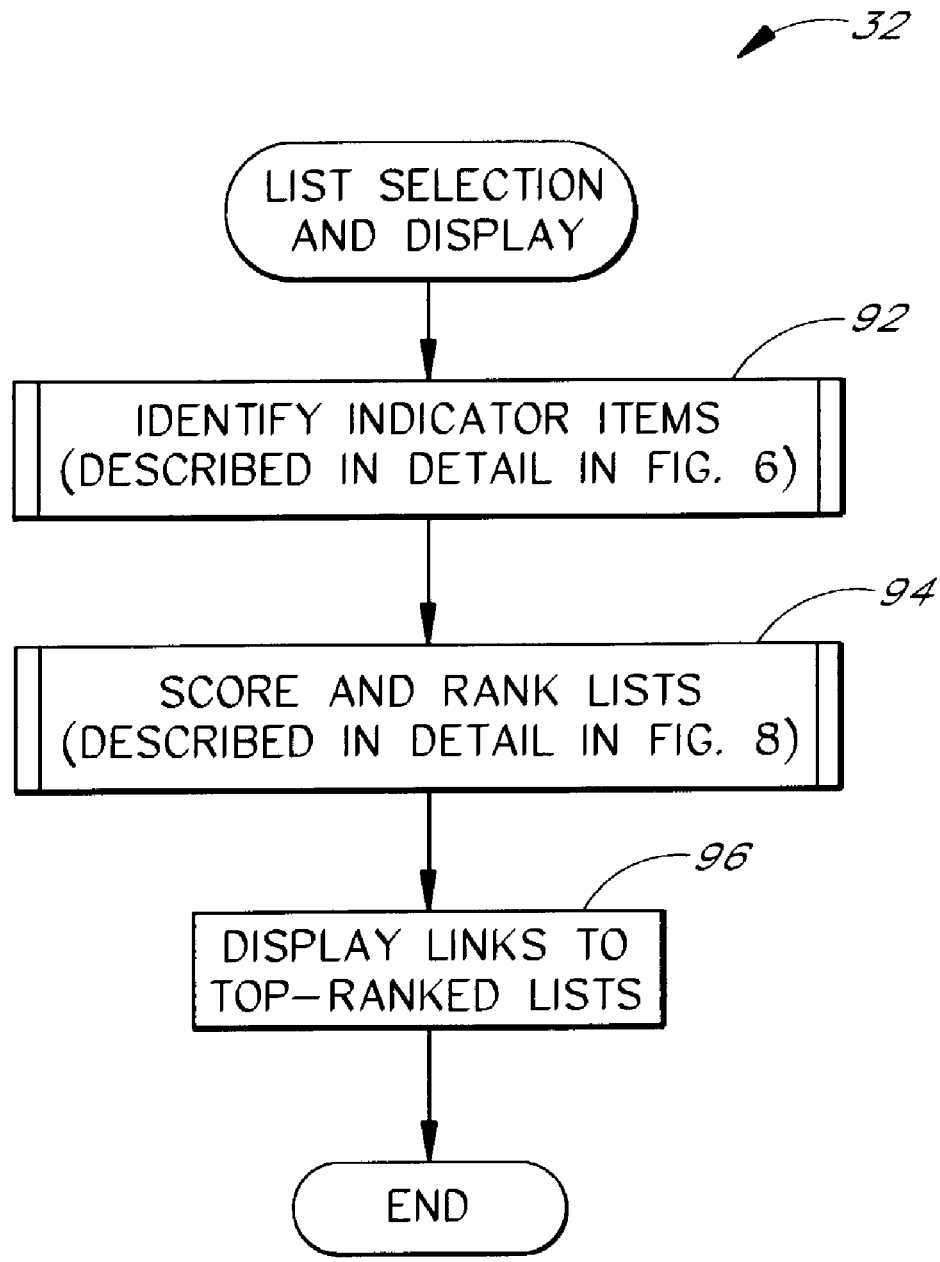
FIG. 5 illustrates an embodiment of a sequence of steps that are performed by the list selection process of FIG. 1 to select and display a set of relevant lists to the user.
Figure 6:
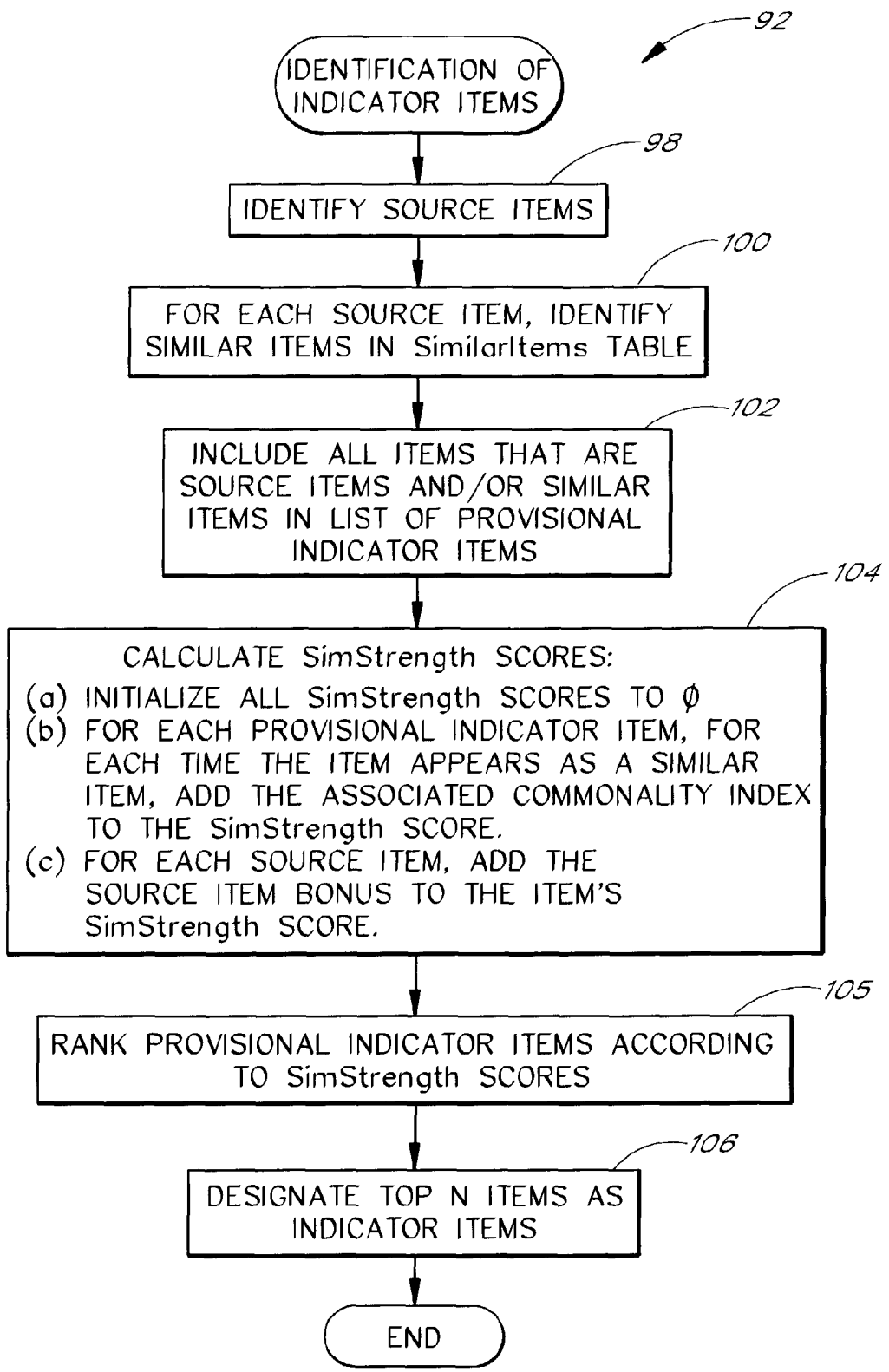
FIG. 6 illustrates a more detailed sequence of steps that are performed to identify indicator items for use by the list selection process of FIG. 5.
Figure 7:
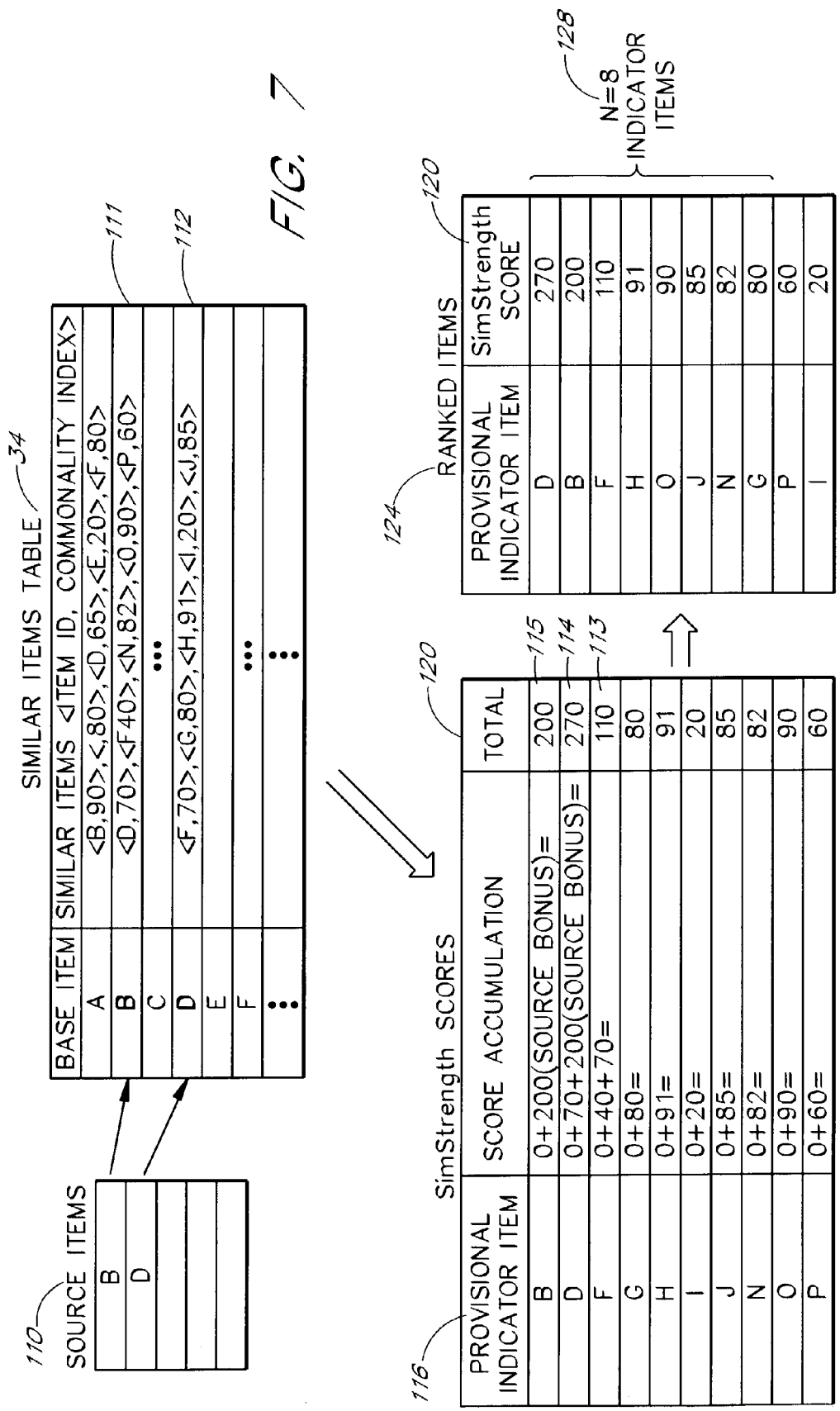
FIG. 7 illustrates one example of the process to identify indicator items described in FIG. 6.
Figure 8:
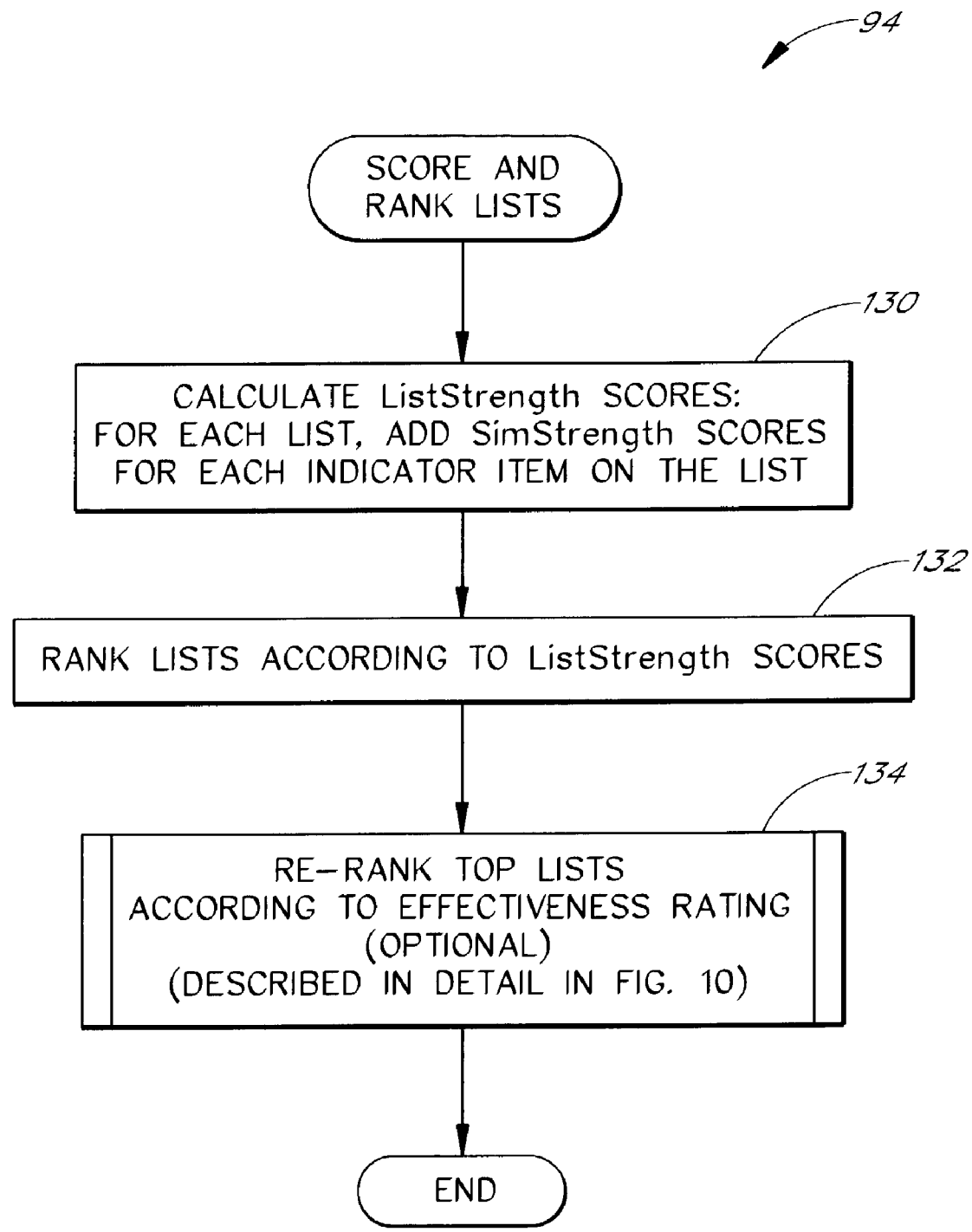
FIG. 8 illustrates a more detailed sequence of steps that are performed to score and rank lists for use by the list selection process of FIG. 5.
Figure 9:
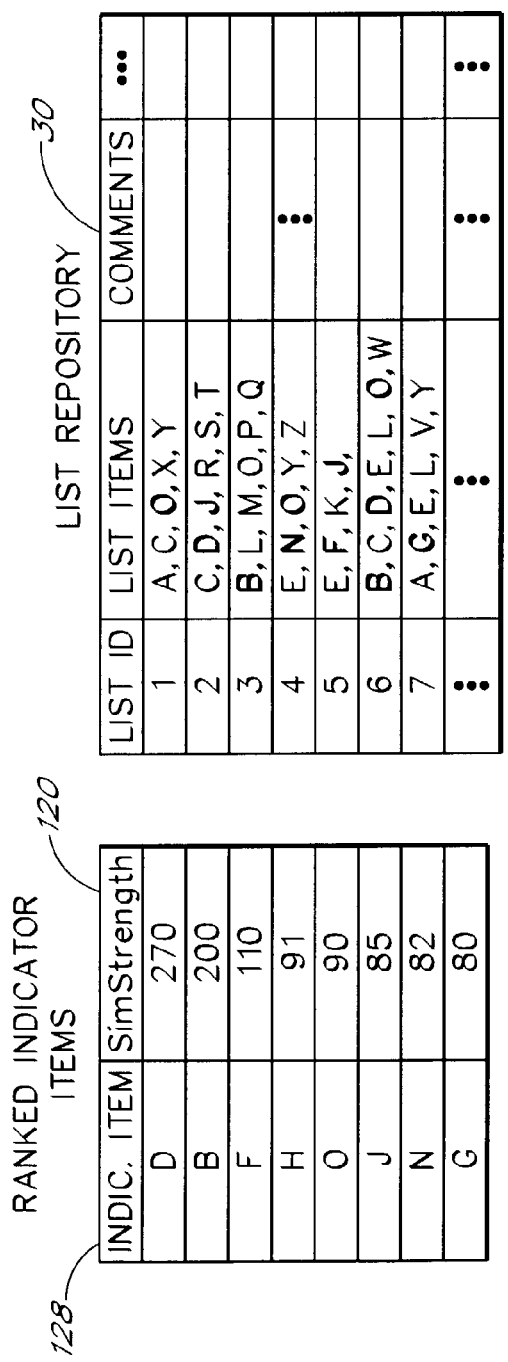
FIG. 9 illustrates one example of the process to score and rank lists described in FIG. 8.
Figure 10:
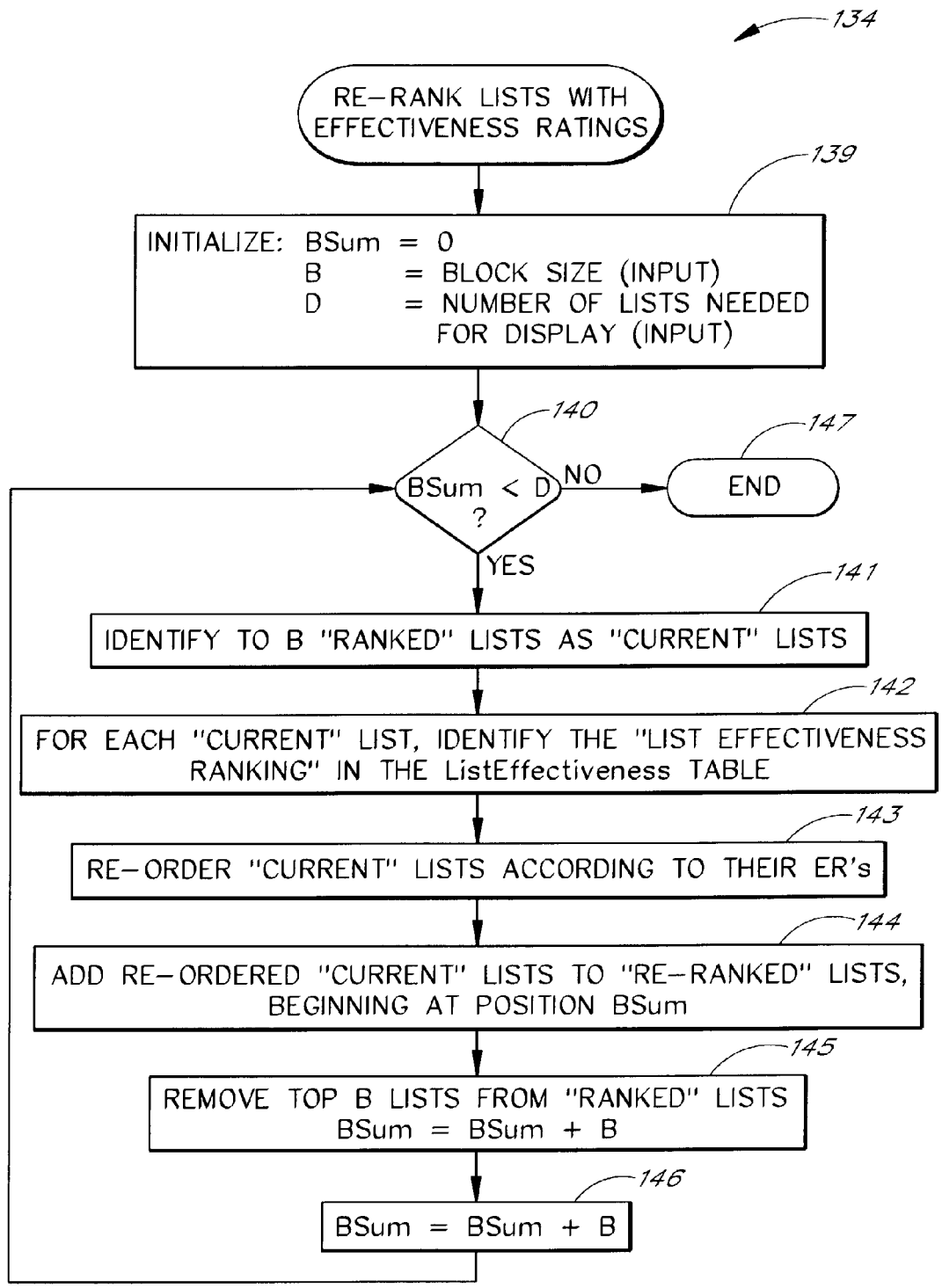
FIG. 10 illustrates a more detailed sequence of steps that are performed to re-rank selected lists based on their perceived effectiveness in order to refine the list scoring and ranking process described in FIG. 8.
Figure 11:
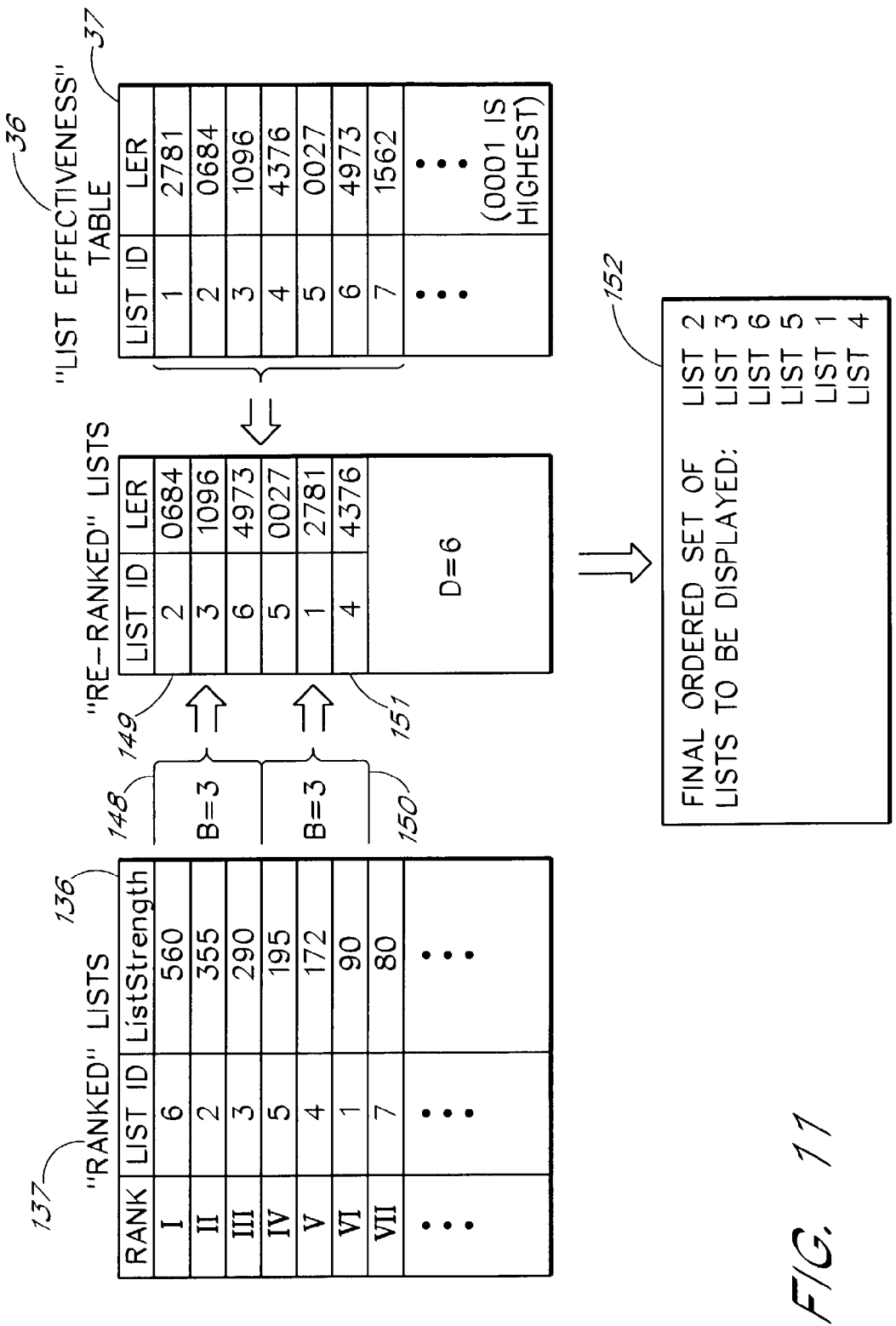
FIG. 11 illustrates one example of the process to re-rank selected lists based on their perceived effectiveness described in FIG. 10.

The list selection process 32 to select and display a set of lists from the repository of lists 30 created by users 12 will now be described with reference to FIGS. 5-11. FIG. 5 illustrates the general sequence of steps that are performed by the process 32, and FIGS. 6, 8, and 10 provide more detail about the steps of various aspects of the process 32. FIGS. 7, 9, and 11 show examples that illustrate portions of the process 32. The process description and the examples illustrated in FIGS. 5-11 are intended to illustrate, and not limit, the scope of the list system. For example, as would be known to one of reasonable skill in the art, the sequence of steps of the list selection process 32 or the list selection algorithm may be altered without departing from the spirit of the list system 26.

The list selection process 32 is preferably invoked in response to an online action of a user 12. As illustrated by FIG. 5, in the first step 92 of the list selection process 32, the list system 26 identifies one or more indicator items. Indicator items are items that the system 26 assumes exemplify the current online interests of the user 12 and that the system 26 will use to help identify lists that it assumes will be of interest to the user 12. The process 92 of identifying indicator items for the list selection process 32 will be described in greater detail with reference to FIG. 6.

Once the list selection process 32 has identified indicator items, the process 32 moves on to step 94 where the process 32 scores and ranks lists in the list repository 30 in order to select those lists that the process 32 identifies as being of the greatest potential interest to the user 12. The process 94 of scoring and ranking lists from the repository 30 will be described in greater detail with reference to FIG. 8.

Once the list selection and display process 32 has identified a set of lists of potential current interest to the user 12, the process 32 moves on to step 96 and displays the lists in a portion of the user's display screen. Various embodiments of display technologies are described with reference to FIGS. 12-17 below.

FIG. 6 describes one embodiment of the process 92 to identify indicator items for use by the list selection process 32. Indicator items may comprise source items or similar items or both. Source items are items that are directly associated with the user's current online activity. Similar items are items that the list system 26 deems to be similar to the source items. In one embodiment, source items and similar items make up a set of indicator items that can be used by the list selection process 32 to identify lists of potential interest to the user 12.

In the first step 98 of the indicator item identification process 92, the process 92 identifies a set of one or more source items. As described above, source items are items that are directly associated with the user's 12 current online activity or recent purchase history or other items that are assumed by the list system 26 to be indicators of the user's 12 current interests. For example, as described above, when a user clicks on a link to view a detail page for a given item, that item can be identified as a source item. When a user performs a search of the items available on the website 10, the items returned as search results can be identified as source items. When a user 12 first logs on to a new session at the website 10 and has no current online activity, the most recently purchased items can be identified as source items.

In one embodiment, the indicator item identification process 92 uses all items associated with the user's 12 current online activity as source items. In one embodiment, because of processing time, space, or other considerations, the indicator item identification process 92 may select a subset of the items associated with the user's 12 current online activity to use as source items. For example, if a search performed at a bookstore website for books on colonial history returned fifty-two titles as search results, the process 92 might choose only the top five titles to use as source items. In one embodiment, the subset of items to be used as source items is selected randomly from the items associated with the user's 12 current online activity.

Once the source items are identified in step 98, the process 92 moves on to step 100 where the process 92 can use the similar items table 34 described earlier to identify a set of similar items for each of the source items. In step 102, the set of source items and the set of similar items are joined to form a set of provisional indicator items. In one embodiment, a subset of the similar items are used as indicator items. In one embodiment, only source items are used as indicator items. In one embodiment, only similar items are used as indicator items.

In the remaining steps 104-106 of the process 92, the provisional indicator items are ranked according to their presumed relevance to the user's current needs, and, if necessary for the sake of speed of processing or for other reasons, only the most highly ranked provisional indicator items will be returned as indicator items by the identification process 92 to the list selection process 32. Alternatively, lists may be generated from all of the indicator items and the lists ranked in accordance with the ListStrength score or the list effectiveness rating discussed below so that only the most strongly correlated or effective lists are presented to the user.

In step 104, the process 92 ranks the provisional indicator items based on their similarity to the set of source items as a whole. To do so, the process 92 calculates a measure called a SimStrength for each provisional indicator item. The SimStrength score is based in part on the commonality index (CI) that is assigned to every similar item in the similar items table 34. Each CI is an indicator of the degree of similarity between a similar item and a source item. In one embodiment, to measure the degree of similarity between a given provisional indicator item and the set of source items as a whole, for each time that the indicator item is listed as a similar item to one of the source items in the similar items table 34, the process 92 adds the associated CI score to the item's SimStrength score. This calculation is made for each provisional indicator item. In addition, the process 92 adds a bonus to the SimStrength score for each provisional indicator item that was also a source item. This calculation will be described in greater detail with respect to the example illustrated in FIG. 7.

When the process 92 has calculated a SimStrength score for each provisional indicator item, the process 92 moves on to step 105, where the process 92 ranks the provisional indicator items according to their SimStrength scores. Once the provisional indicator items have been ranked, if the list selection process 32 has requested a certain number N of indicator items, the indicator item identification process 92 can move on to step 106 to designate the N top-ranked provisional indicator items as indicator items, and the input item identification process 92 is complete, allowing the list selection process 32 to continue on to step 94. In one embodiment, the process 92 identifies an M number of top-ranked provisional indicator items, where M is greater than N, and then designates a randomly chosen N number of provisional indicator items out of the M top-ranked items as indicator items.

FIG. 7 provides an example of the indicator item identification process 92. It is to be understood that in the example, product identification numbers (itemIDs), the similar items table 34, commonality index (CI) scores, and SimStrength scores have all been simplified for purposes of explanation. Arrows indicate the flow of information in the process 92. In the example shown in FIG. 7, two source items 110, B and D, have been identified as being associated with the user's current online activities and, therefore, as being useful for locating relevant lists to display to the user 12.

The indicator item identification process 92 consults the similar items table 34 to identify items that are similar to the source items 110. In the similar items table 34 shown in FIG. 7, each base item is associated with five similar items. Each similar item is identified by its itemID, and each is assigned a commonality index (CI) score ranging from 0 to 100.

The indicator item identification process 92 creates a list of provisional indicator items 116 that comprises any item that is either a source item 110 or a similar item to one of the source items 110 from the similar items table 34. In the example in FIG. 7, the source item B is listed in row 111 of the similar items table 34 as having similar items D, F, N, O, and P. The source item D is listed in row 112 of the similar items table 34 as having similar items F, G, H, I, and J. All of these items from rows 111 and 112 in the similar items table 34 are included in the list of provisional indicator items 116.

The indicator item identification process 92 calculates a SimStrength score 120 for each provisional indicator item 116. To do so, for each provisional indicator item 116, the process 92 accumulates every CI score associated with the item in the relevant rows 111, 112 of the similar items table 34. For example, the item F appears in the similar items table 34 as being similar to both source item B with a CI score of 40, and to source item D with a CI score of 70. These CI scores are added (40+70) to produce the SimStrength score total of 110 shown 113 for item F. In the example of FIG. 7, the SimStrength scores of provisional indicator items that are also source items are given a bonus of 200 in addition to any accumulated CI scores. Item D has a CI score of 70 as a similar item to source item B, to which its source item bonus of 200 is added to is added (70+200) to make a total SimStrength score 114 of 270. Item B is not listed as being similar to item D and, therefore, has no accumulated CI scores, but does receive a bonus of 200 for being a source item for a total SimStrength score 115 of 200.

The SimStrength scores are taken to be an indicator of the degree of similarity that a provisional indicator item 124 has to the set of source items 110. The items with the highest SimStrength scores can therefore be presumed to be those items from the set of provisional indicator items that have the greatest relevance to the user's 12 current online interests, and their presence in a user-created list can be used as an indicator of potential interest to the current user 12.

When the set of SimStrength score totals 120 have been calculated for all provisional indicator items 116, the process 92 ranks the items 116, re-ordering them 124 according to their SimStrength scores 120 as depicted in table 124. If the list selection process 32 has requested a fixed number of indicator items, the process 92 can return the top-ranked indicator items, or a randomly chosen set from amongst the top-ranked indicator items. In the example of FIG. 7, eight indicator items have been requested, and the eight top-ranked provisional indicator items 128 are selected for return to the list selection process 32.

FIG. 8 shows the general sequence of steps for a process 94 to score and rank lists from the lists repository 30 based on the presence of indicator items in the lists and on the relative SimStrength scores of those items. In step 130, the process 94 calculates a ListStrength score for each list. In one embodiment, the ListStrength score for each list is calculated by identifying all indicator items on the list and by adding the SimStrength score for each. In one embodiment, a bonus is added to the ListStrength score for each indicator item that is also a source item.

In one embodiment, in order to increase the efficiency of the list scoring and ranking process 94, the system 26 maintains a mapping of individual items to lists that contain the items, such that, given the itemID of an indicator item, the system 26 can easily identify lists that contain the item and can appropriately increment the ListStrength of the identified lists.

When the process has calculated all ListStrength scores in step 130, it moves on to step 132, where the process 94 ranks the lists according to their ListStrength scores. As an optional step, the process can execute step 134, in which the top lists that have already been ranked according to ListStrength scores are re-ranked according to a list effectiveness rating (LER) that expresses the effectiveness of a list to encourage sales of the website's products. The process of step 134 is described in greater detail with reference to FIG. 10. In one embodiment, once the lists have been ranked and, if desired, re-ranked, the top lists are selected for display in step 96 of the list selection and display process 32.

FIG. 9 provides an example of scoring and ranking lists, without the optional re-ranking step 134 of FIG. 8. The example in FIG. 9 builds on the example presented in FIG. 7. At the end of the sequence of steps illustrated in FIG. 7, the list selection process 32 had identified a list of eight top-ranked indicator items 128 with respective SimStrength scores 120. These top-ranked indicator items 128 and their SimStrength scores 120 are reproduced in FIG. 9 for ease of explanation.

The list scoring and ranking process 94 uses these ranked items 128 and their SimStrength scores 120, in conjunction with information from the repository of lists 30, to score the lists on their relevance to the user's current needs. The process 94 does this by noting every occurrence of an indicator item in a list. In FIG. 9, the indicator items 128 that appear in lists in the list repository 30 are highlighted by being written in boldface type.

A relevance score, called a ListStrength score, is calculated for each list by adding the SimStrength scores of every indicator item that appears in the list. For example, in FIG. 9, List1 contains, among other items, the indicator item O with a SimStrength score 120 of 90. Since this is the only indicator item 128 found in List1, the ListStrength score 136 for List1 is 90. Similarly, the ListStrength score 136 for List6 is calculated by adding the SimStrength scores 120 of the three indicator items found in List6, namely B, D, and O, for a total score of 560.

Once the ListStrength scores 136 for the lists have been calculated, the lists can be ranked according to their ListStrength scores, as is shown in table 137 of "ranked" lists. The process 32 has now identified and ranked the lists that are presumed to be of greatest relevance to the user's current needs.

In one embodiment, the list system 26 displays the top ranked lists, or a randomly chosen subset thereof, to a viewing user 12 in the order of their ranking. Thus, the top-ranked list will be displayed in a first, and, therefore presumably most prominent, position. In one embodiment, the set of lists selected for display is supplemented by at least one randomly chosen list. Re-ordering, or re-ranking, the selected set of lists can affect the positional prominence of each list, and if only a top subset of the re-ranked lists is chosen for display, re-ranking can also affect the set of lists selected for display. In one embodiment, a list re-ranking process 134 re-ranks the top ranked lists in order to give additional prominence to lists that exhibit some preferred characteristic. In one embodiment, the list re-ranking process 134 draws upon information that is periodically gathered and stored by the system 26 to generate a list effectiveness rating (LER) for each list. The LER of a list is based on information gleaned from the browsing histories of users who have viewed the list. The LER is a measure of the list's comparative performance in encouraging users 12 to make purchases at the website 10 or to place items in their shopping carts soon after having viewed the list or to exhibit some other user action. A list effectiveness table 36 associates a list effectiveness rating (LER) 37 with each list. Thus, the re-ranking process 134 can give preference to lists that have been shown, for example, to be associated with subsequent purchases or shopping cart activity.

Alternatively, other bases upon which to re-rank lists may also be implemented without departing from the spirit of the list system. In one embodiment, re-ranking of lists takes into account explicit ratings that users have submitted for the lists. In one embodiment, the process 134 takes into account both the LER of a list and the relative profitability of the items that were subsequently purchased or placed in a shopping cart. In this way, preference is given not only to lists that have proven to encourage sales, but, more specifically, to lists that have proven to encourage relatively profitable sales.

In one embodiment, the re-ranking process 134 re-ranks blocks of top-ranked lists and uses the re-ranked blocks to build a new set of "re-ranked" lists, as will be described in greater detail below. By re-ranking the lists in blocks, each list is guaranteed to occupy a final position that is relatively close to its original position, but also reflects the influence of its LER.

FIG. 10 shows in greater detail the process 134 for re-ranking lists according to their list effectiveness ratings (LER) 37. In step 139, the process 134 initializes several variables. A BSum counter variable, which indicates how many lists have been re-ranked, is initialized to 0. Two other variables, a block size B that indicates the number of lists that will be re-ranked at once, and a value D that indicates the total number of lists required by the system 26 for display, can be predefined, such as by the website operator.

In step 140, the re-ranking process 134 determines if enough lists have already been re-ranked. If they have not, the process moves to step 141 where it creates a copy of the next block of ranked lists to process. For the purposes of this description, these list copies identified for re-ranking are called the "current" lists.

In step 142, the LER for each "current" list is identified, and in step 143, the "current" lists are re-ranked according to their LERs. In step 144, these re-ranked "current" lists are added to the set of "re-ranked" lists, beginning at position BSum. In step 145, the top B lists from the "ranked lists," which correspond to the lists that have just been re-ranked, are removed, and in step 146, the value of the BSum counter is incremented by the block size B.

At this point, the re-ranking process 134 returns to step 140, where it once again determines if enough lists have already been re-ranked. If enough lists still have not been ranked, the system 134 once again cycles through steps 141-146, processing another block of lists according to their LERs and adding the re-ranked block to the set of "re-ranked" lists. If, in step 140, the process 134 determines that enough lists for display have been identified and re-ranked, then the process 134 moves on to step 147, where the re-ranking process is complete, and the list system 26 can display the top re-ranked lists.

FIG. 11 provides an example of the re-ranking process 134 that builds on the previous examples of FIGS. 7 and 9. The table of "ranked" lists 137 from FIG. 9 is reproduced in FIG. 11 for ease of description. In the table of "ranked" lists 137, the lists are ranked according to their ListStrength scores 136, which were a measure of the number and similarity strength of indicator items in each list. The re-ranking process 134 draws on information from this table 137 as well as from information in the list effectiveness table 36 that is generated based on users' 12 purchase and clickstream histories.

The re-ranking process 134 begins by identifying a block of top-ranked lists to re-rank. In the example shown in FIG. 11, the block size B is three. Therefore, the top three lists are identified for re-ranking. In this example, the top three lists 148 are List6, List2, and List3. Referring to the list effectiveness table 36, which ranks the lists based on their power to encourage users to purchase, or to consider purchasing, items from the product catalog, the list effectiveness ratings (LERs) 37 for these three lists are 4973, 0684, and 1096, respectively. In the example shown in FIG. 11, an LER score of 0001 is the highest possible score, and a LER score of 9999 is the lowest. Therefore, re-ranking the three "current" lists 148 according to their LER scores produces the new ordering 149: List2, List3, List6. These re-ranked lists 149 are now the top three lists that will be displayed to the user. Thus, among these top three lists, the order of presentation has been altered slightly to give extra prominence to the lists that historically have been shown to encourage viewers to buy or to consider buying products.

In the example shown in FIG. 11, the number of lists needed for display, D, is six. At this point, the process 134 has only re-ranked three lists. Therefore, the process identifies the next block 150 of three lists to re-rank. This time the lists are List5, List4, and List1. Based on their LER scores 37, the block of lists 150 will be re-ranked to a new ordering of List5, List1, List4, and these three lists 151 will be added to the set of lists 152 selected for display to the user 12. At this point, six lists have been selected for display, and since these are all that are required by the list selection and display process 32, any remaining ranked lists are ignored. The final set of lists to be displayed 152 remains: List2, List3, List6, List5, List1, List4.

Alternative Embodiments

As disclosed above with reference to FIGS. 5 and 6, the list selection process 32 initiates the selection of lists appropriate to a user's current online interests by identifying a set of one or more "source items" that are associated with the user's current or recent online activities. FIGS. 12-17 illustrate examples of several technologies for identifying source items, as well as several technologies for displaying a set of selected lists. It is to be understood that in addition to the technologies described herein, other technologies for identifying source items and other technologies for displaying lists may exist that fall within the spirit of the list system 26. In addition, the pairings of source item identification technologies and list display technologies in FIGS. 12-17 are presented as examples only, and are not meant to imply any necessary association between the source item identification technology and the list display technology illustrated in any given figure.

Figure 12:
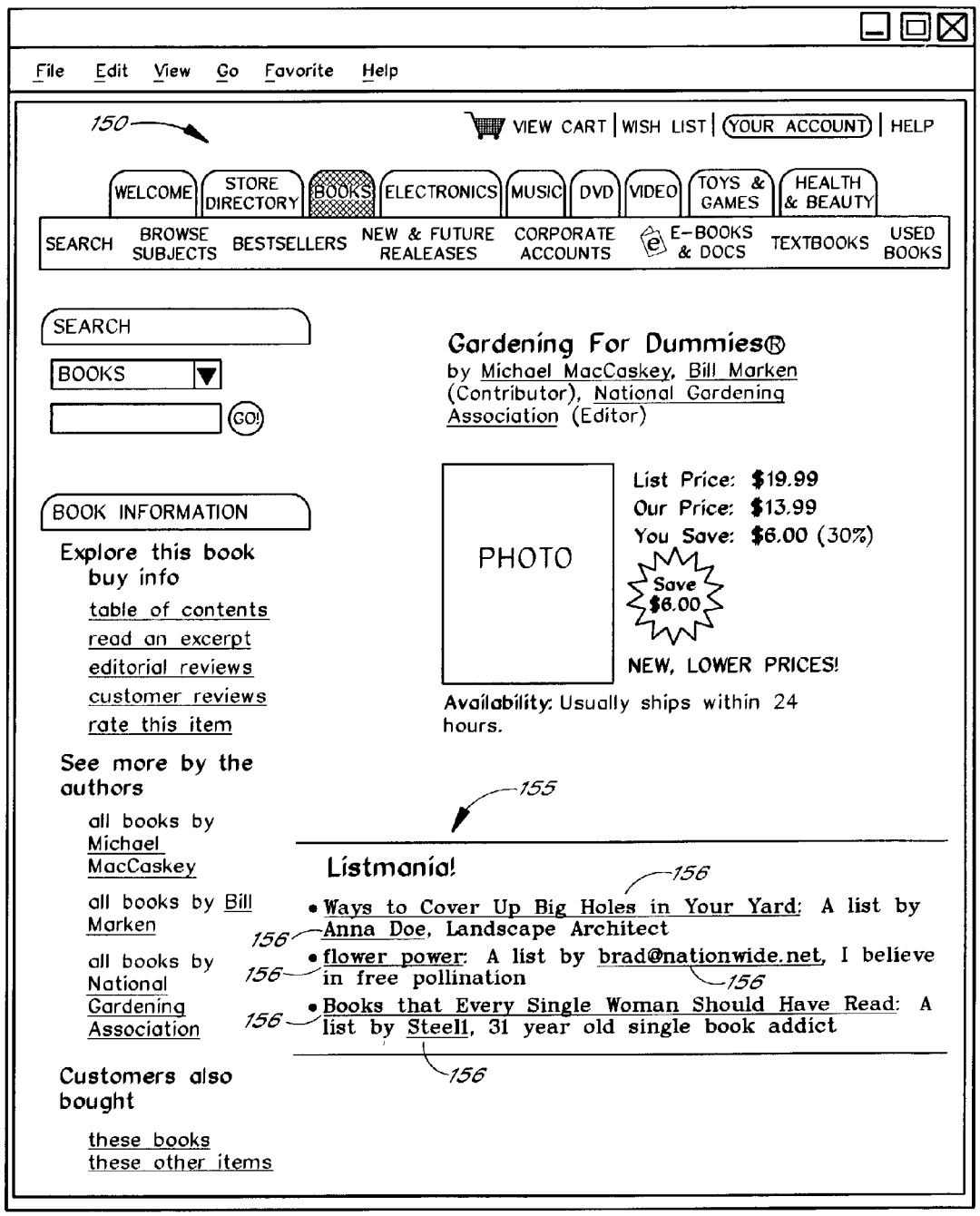
FIG. 12 illustrates the general configuration of a Web page that presents a set of lists to a user who has clicked on a product detail page.

FIG. 12 shows a general form of a product detail page 150 from a merchant bookstore website. The site is preferably arranged such that, in order to access the detail page 150 of a product, a user 12 ordinarily must either select a link associated with that product or submit a search query uniquely identifying the product. Thus, access by a user 12 to a product's detail page 150 generally represents an affirmative request by the user 12 for information about that product. In one embodiment of the list system 26, when a user 12 accesses a product's detail page 150, the list selection process 32 identifies the product as a source item. In this case, the list selection process 32 uses this single source item 152 together with the similar items identified for the source item in the similar items table 34 as indicator items in order to select lists, as will be described in greater detail with reference to FIG. 5.

As described earlier, FIG. 5 illustrates the general sequence of steps that are performed by the list selection process 32, and FIGS. 6 and 8 provide more detail about the steps of various embodiments of the process 32. These figures will now be discussed again with reference to the example shown in FIG. 12. For purposes of brevity, the optional re-ranking process 134 described with reference to FIG. 10 will not be discussed again here, but the re-ranking technologies described in FIG. 10 may be employed in conjunction with the use of a "detail page" item as a source item as exemplified in FIG. 12.

The list selection process 32 is preferably invoked in response to an online action of a user 12, which, in this case, is an action that displays a product detail page 150. As illustrated by FIG. 5, in the first step 92 of the list selection process 32, the list system 26 identifies one or more indicator items. The process 92 of identifying indicator items for the list selection process 32 is described in greater detail with reference to FIG. 6.

FIG. 6 describes one embodiment of the process 92 to identify indicator items for use by the list selection process 32. Indicator items comprise source items and similar items. Source items are items that are directly associated with the user's current online browsing activity. Similar items are items that the list system 26 retrieves from the similar items table 34 and that the list system 26 deems to be similar to the source items. Together, source items and similar items make up a set of indicator items that can be used by the list selection process 32 to identify lists of potential interest to the user 12.

In the first step 98 of the indicator item identification process 92, the process 92 identifies a set of one or more source items. As described above, source items are items that are directly associated with the user's 12 current online activity or with the user's 12 recent purchase history and are assumed by the list system 26 to be direct indicators of the user's current interests. When a user clicks on a link to view a detail page for a given item, the indicator item identification process 92 assumes that the item exemplifies the user's 12 current online interests and identifies the item as a source item. In the case of the example portrayed in FIG. 12, when the link to the product detail page for the *Gardening For Dummies* book is selected, then the list selection process 32 identifies *Gardening For Dummies* as the source item. The process 32 can use the book's ISBN number 152 as the itemID for identification purposes during the indication item identification process 92.

Once the source item is identified in step 98, the process 92 moves on to step 100 where the process 92 uses the similar items table 34 described earlier to identify a set of similar items for the source item. With respect to the example of FIG. 12, we can imagine that a similar items table 34 that holds five similar items for the source item *Gardening For Dummies* might list the following five books as similar items: *Gardening from Scratch, Perennial Flowers for Dummies, Homebrewing for Dummies, Square Foot Gardening*, and *The Herbfarm Cookbook: A Guide to the Vivid Flavors of Fresh Herbs*.

In step 102, the source item and the set of similar items are joined to form a set of provisional indicator items.

In the remaining steps 104-106 of the process 92, the provisional indicator items will be ranked according to their presumed relevance to the user's current needs, and, if necessary for the sake of processing time, space, or other considerations, only the most highly ranked provisional indicator items will be returned as indicator items by the identification process 92 to the list selection process 32.

In step 104, the process 92 ranks the provisional indicator items based on their statistical similarity to the set of source items. To do so, the process 92 calculates a measure called a SimStrength for each provisional indicator item. The SimStrength score is based in part on the commonality index (CI), which is a measure of the degree of similarity between a similar item and a base item in the similar items table 34. In some embodiments that use more than one source item, the SimStrength score of each provisional indicator item can reflect its similarity to the set of source items as a whole. In this example, because "Gardening For Dummies" is the only source item, each similar item's SimStrength score is the same as its commonality index (CI) score from the similar items table 34. The process 92 adds a bonus to the SimStrength score for each provisional indicator item that is also a source item. In this case, only "Gardening For Dummies" would receive this bonus, and the bonus would be the entire SimStrength score for "Gardening For Dummies".

When the process 92 has calculated a SimStrength score for each provisional indicator item, the process 92 moves on to step 105, where the process 92 ranks the provisional indicator items according to their SimStrength scores. Once the provisional indicator items have been ranked, if the list selection process 32 has requested a certain number N of indicator items, the indicator item identification process 92 can designate the N top-ranked provisional indicator items as indicator items, and the item identification process 92 is complete. In the example given above, where the source item *Gardening For Dummies* is associated with five similar items, there would be a total of six provisional indicator items, and, if necessary, only the top-ranked N number of items can be used as indicator items.

Once the item identification process 92 has identified indicator items, the list selection process 32 from FIG. 5 moves on to step 94 where the process 32 scores and ranks lists in the list repository 30 in order to select those lists that the process 32 identifies as being of the greatest potential interest to the user 12. The process 94 of scoring and ranking lists from the repository 30 is described in greater detail with reference to FIG. 8.

FIG. 8 shows the general sequence of steps for a process 94 to score and rank lists from the lists repository 30 based on the presence of indicator items in the lists and on the relative SimStrength scores of those indicator items. In step 130, the process 94 calculates a ListStrength score for each list. In one embodiment, the ListStrength score for each list is calculated by identifying all indicator items on the list and by adding the SimStrength score for each. To continue with the example given above, if *Gardening For Dummies* and the other five similar books are all counted as indicator items, then the lists of the list repository 30 will be scored based on the presence of these six books in the lists, with weighting given to reflect the SimStrength score of each included book. When the process has calculated a ListStrength score for each list, it moves on to step 132, where the process 94 ranks the lists according to their ListStrength scores. As an optional step, the process can execute step 134, in which the ranked lists are re-ranked according to a list effectiveness rating (LER) that expresses the effectiveness of a list to encourage sales of the website's products or to express some other desirable characteristic. The process of step 134 is described in greater detail with reference to FIG. 10. Once the lists have been ranked and, if desired, re-ranked, the top lists can be selected for display in step 96 of the list selection and display process 32.

The list selection process 32 carries out its tasks quickly enough that when the selected detail page 150 is displayed, the process 32 can include, in a portion of the page 150, a set of selected lists 155 which are assumed to be relevant to the user's current online interests. In the example shown in FIG.

12, the list selection process 32 displays links to three lists: "Ways to Cover Up Big Holes in Your Yard," "flower power," and "Books that Every Single Woman Should Have Read," each of which comprises one or more of the six books identified as indicator items.

FIG. 12 also illustrates one technology for displaying the selected lists. In this example, the titles, authors, and self-descriptions of the selected lists are displayed in text at the bottom 155 of the product detail page, and links are provided for accessing full displays of each list or more information about each list author.

Figure 13:
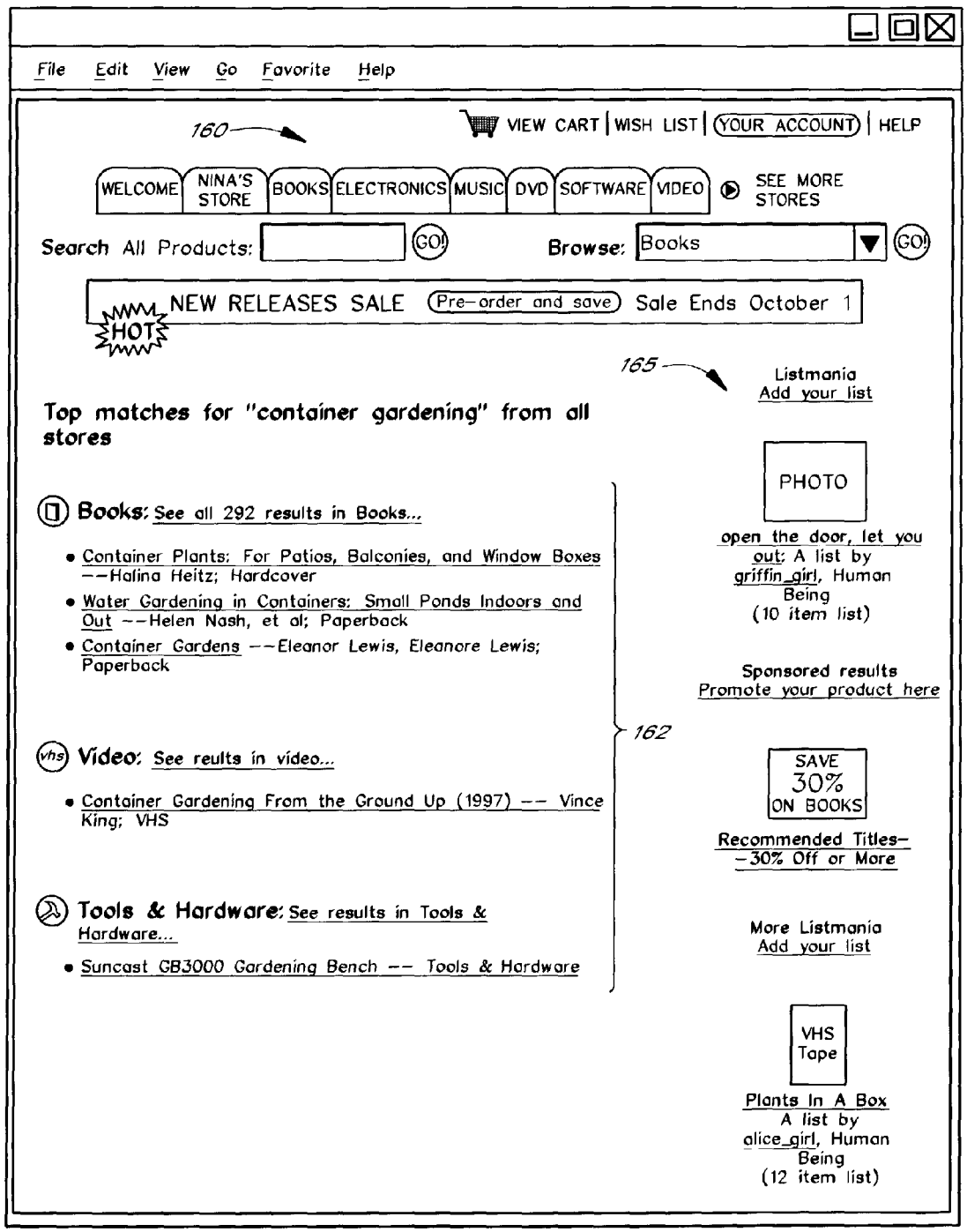
FIG. 13 illustrates the general configuration of a Web page that presents a set of lists to a user who has performed a search using the website's search engine.

FIG. 13 shows a general form of a search results page 160. When a user 12 wishes to search the products catalog for items matching a certain set of criteria, such as, for example, books written about a specified topic, or music selections featuring a specified artist, or any item with a given word in its title, the user 12 can enter one or more search terms into the website's 10 search engine. The search engine returns a search results page 160 with links 162 to the products that it has identified as matching the search terms. For example, the sample Web page 160 in FIG. 13 illustrates a response to a search query on the subject of "container gardening." In one embodiment of the list system 26, when a user 12 initiates a search, the results 162 produced by the search engine are identified by the list selection process 32 as source items, as will be described in greater detail with reference to FIG. 5. In one embodiment of the list system 26, in order to allow for quick and efficient selection of lists for display in response to a user's search request, a subset of the search results 162 may be used as source items.

As described earlier, FIG. 5 illustrates the general sequence of steps that are performed by the list selection process 32, and FIGS. 6 and 8 provide more detail about the steps of various embodiments of the process 32. These figures will now be discussed again with reference to the example shown in FIG. 13. For purposes of brevity, the optional re-ranking process 134 described with reference to FIG. 10 will not be discussed again here, but the re-ranking technologies described in FIG. 10 may be employed in conjunction with the use of search query result items as source items, as exemplified in FIG. 13.

The list selection process 32 is preferably invoked in response to an online action of a user 12, which, in this case, is submission of a search query that results in the display of a search results page. As illustrated by FIG. 5, in the first step 92 of the list selection process 32, the list system 26 identifies one or more indicator items. The process 92 of identifying indicator items for the list selection process 32 is described in greater detail with reference to FIG. 6.

FIG. 6 describes one embodiment of the process 92 to identify indicator items for use by the list selection process 32. Indicator items comprise source items and similar items. Source items are items that are directly associated with the user's current online browsing activity. Similar items are items that the list system 26 retrieves from the similar items table 34 and that the list system 26 deems to be similar to the source items. Together, source items and similar items make up a set of indicator items that can be used by the list selection process 32 to identify lists of potential interest to the user 12.

In the first step 98 of the indicator item identification process 92, the process 92 identifies a set of one or more source items. As described above, source items are items that are directly associated with the user's 12 current online activity or with the user's 12 recent purchase history and are assumed by the list system 26 to be direct indicators of the user's current interests. When a user submits a search query, the items returned by the search engine as search results are assumed by the list selection process 32 to exemplify the user's 12 current online interests and are identified by the list selection process 32 as source items. In the case of the example portrayed in FIG. 13, when a search query for "container gardening" is submitted, the list selection process 32 assumes that the five items returned as search results 162, namely the three books, one video, and one tool, exemplify the user's 12 current online interests and identifies the five items as the current source items.

Once the source items are identified in step 98, the process 92 moves on to step 100 where the process 92 uses the similar items table 34 described earlier to identify a set of similar items for the source items. In step 102, the set of source items and the set of similar items are joined to form a set of provisional indicator items.

In the remaining steps 104-106 of the process 92, the provisional indicator items will be ranked according to their presumed relevance to the user's current needs, and, if necessary for the sake of processing time, space, or other considerations, only the most highly ranked provisional indicator items will be returned as indicator items by the identification process 92 to the list selection process 32.

In step 104, the process 92 ranks the provisional indicator items based on their statistical similarity to the set of source items. To do so, the process 92 calculates a measure called a SimStrength for each provisional indicator item. The SimStrength score is based in part on the commonality index (CI), which is a measure of the degree of similarity between a similar item and a base item, and which is assigned to every similar item in the similar items table 34. In the example in FIG. 13, each provisional indicator item's SimStrength score is calculated in part as an aggregation of its commonality index (CI) scores with respect to each of the five source items. In addition, the process 92 adds a bonus to the SimStrength score for each provisional indicator item that is also a source item. In this case, all five of the source items would receive this bonus, and the individual SimStrength scores would be calculated by adding the bonus to any CI scores the source items receive for being similar to one or more other source items.

When the process 92 has calculated a SimStrength score for each provisional indicator item, the process 92 moves on to step 105, where the process 92 ranks the provisional indicator items according to their SimStrength scores. Once the provisional indicator items have been ranked, if the list selection process 32 has requested a certain number N of indicator items, the indicator item identification process 92 can designate the N top-ranked provisional indicator items as indicator items, and the indicator item identification process 92 is thus complete.

Once the item identification process 92 has identified indicator items, the list selection process 32 from FIG. 5 moves on to step 94 where the process 32 scores and ranks lists in the list repository 30 in order to select those lists that the process 32 identifies as being of the greatest potential interest to the user 12. The process 94 of scoring and ranking lists from the repository 30 is described in greater detail with reference to FIG. 8.

FIG. 8 shows the general sequence of steps for a process 94 to score and rank lists from the lists repository 30 based on the presence of indicator items in the lists and on the relative SimStrength scores of those indicator items. In step 130, the process 94 calculates a ListStrength score for each list. In one embodiment, the ListStrength score for each list is calculated by identifying all indicator items on the list and by adding the SimStrength score for each. When the process has calculated all ListStrength scores in step 130, it moves on to step 132, where the process 94 ranks the lists according to their ListStrength scores. As an optional step, the process can execute step 134, in which the top lists that have already been ranked according to ListStrength scores are re-ranked according to a list effectiveness rating (LER) that expresses the effectiveness of a list to encourage sales of the website's products or to express some other desirable characteristic. The process of step 134 is described in greater detail with reference to FIG. 10. Once the lists have been ranked and, if desired, re-ranked, the top lists can be selected for display in step 96 of the list selection and display process 32.

The list selection process 32 carries out its tasks quickly enough that when the search results page 160 is displayed, the process 32 can include, in a portion of the page 160, a set of selected lists 165 which are assumed to be relevant to the user's 12 current online interests. In the example shown in FIG. 13, the list selection process 32 displays links to two lists, each of which comprises one or more indicator items that are deemed to be relevant to the user's 12 current interests.

FIG. 13 also illustrates one technology for displaying the selected lists. In this example, the titles, authors, and self-descriptions are displayed in text 165 on the search results page, and links are provided for accessing full displays of each list. Additionally, a graphic image of an item from each list may be displayed, as well as information regarding the number of items in each list.

Figure 14:
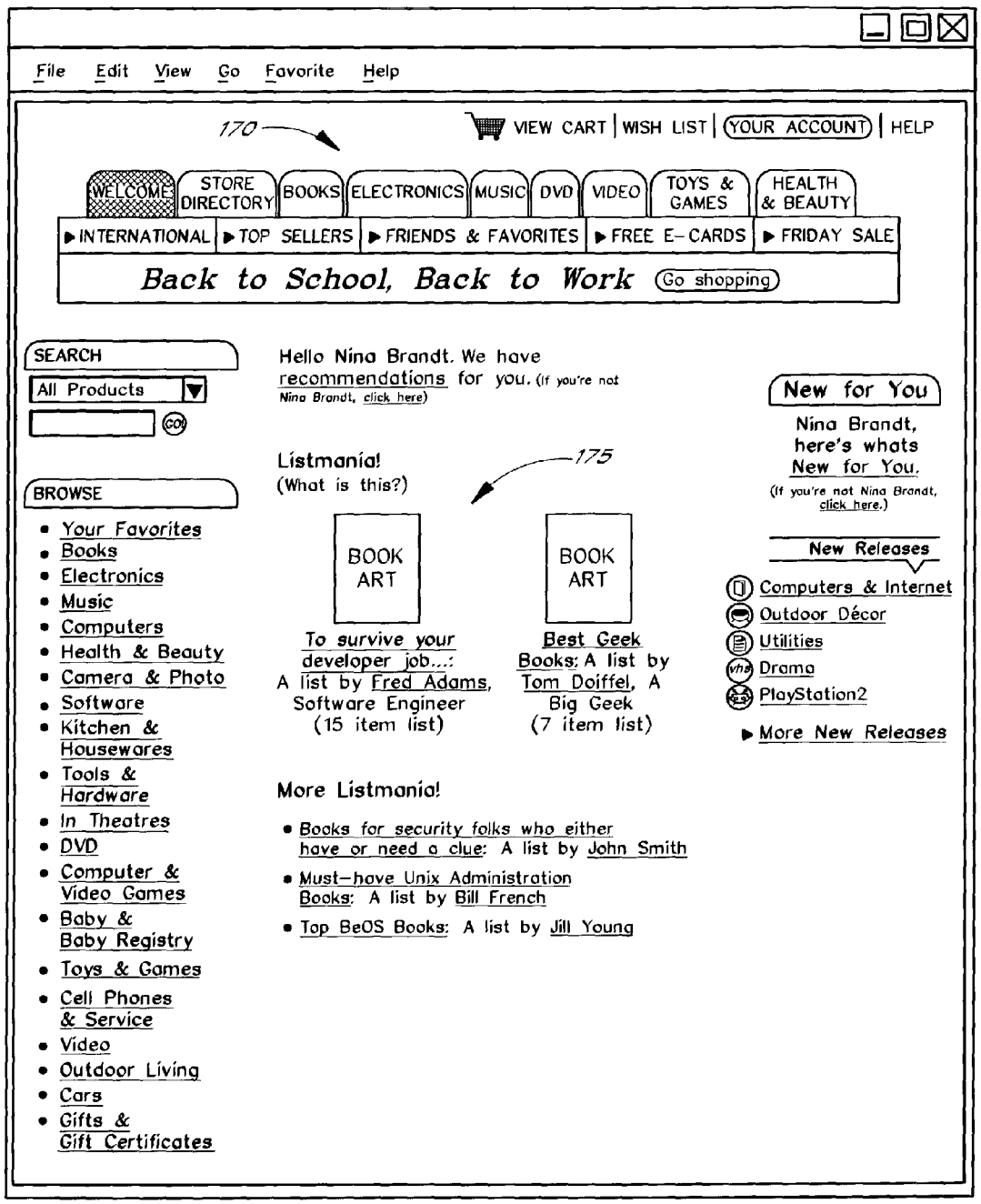
FIG. 14 illustrates the general configuration of a Web page that presents a set of lists to a user who has clicked on the home page of the website described in FIG. 1.

FIG. 14 shows a general form of a personal welcome page 170 that can be displayed when a user 12 first accesses the website 10 from the Internet 14 in a given session, provided that identification information about the user 12 is available to the website 10. Since the list selection process 32 at this point has no current online browsing activity for the user 12 from which to infer the user's current interests, the list selection process 32 can make the assumption that information about the user's 12 recent purchases may provide a hint as to current interests. The list selection process 32 can use purchase history information in the user's profile 22, if any exists, to identify items that the user 12 has previously purchased and to designate these items as source items for list selection.

As described earlier, FIG. 5 illustrates the general sequence of steps that are performed by the list selection process 32, and FIGS. 6 and 8 provide more detail about the steps of various embodiments of the process 32. These figures will now be discussed again with reference to the example shown in FIG. 14. For purposes of brevity, the optional re-ranking process 134 described with reference to FIG. 10 will not be discussed again here, but the re-ranking technologies described in FIG. 10 may be employed in conjunction with the use of previously purchased items as source items, as exemplified in FIG. 14.

The list selection process 32 is preferably invoked in response to an online action of a user 12, which, in this case, is selection of the merchant website homepage. At some merchant websites, if user identification information is available, selection of the merchant website homepage can result in the display of a personalized welcome page. As illustrated by FIG. 5, in the first step 92 of the list selection process 32, the list system 26 identifies one or more indicator items. The process 92 of identifying indicator items for the list selection process 32 is described in greater detail with reference to FIG. 6.

FIG. 6 describes one embodiment of the process 92 to identify indicator items for use by the list selection process 32. Indicator items comprise source items and similar items. Source items are items that are directly associated with the user's current online browsing activity. Similar items are items that the list system 26 retrieves from the similar items table 34 and that the list system 26 deems to be similar to the source items. Together, source items and similar items make up a set of indicator items that can be used by the list selection process 32 to identify lists of potential interest to the user 12.

In the first step 98 of the indicator item identification process 92, the process 92 identifies a set of one or more source items. As described above, source items are items that are directly associated with the user's 12 current online activity or with the user's 12 recent purchase history and are assumed by the list system 26 to be direct indicators of the user's current interests. When a user accesses a personal welcome page, the list selection process 32 can access the user's 12 purchase history from the user profiles 22, and, working on the assumption that recently purchased items provide some indication of a user's 12 interests, the process 92 identifies any recently purchased items as source items. In the case of the example portrayed in FIG. 14, when a personal welcome page for "Nina Brandt" is displayed, the list selection process 32 examines Nina Brandt's purchase history information and identifies her recently purchased items, for example two books, "UNIX Internals" and "Introduction to Network File System", as the current source items.

Once the source items are identified in step 98, the process 92 moves on to step 100 where the process 92 uses the similar items table 34 described earlier to identify a set of similar items for the source items. In step 102, the two source items of this example and the set of similar items are joined to form a set of provisional indicator items.

In the remaining steps 104-106 of the process 92, the provisional indicator items will be ranked according to their presumed relevance to the user's current needs, and, if necessary for the sake of processing time, space, or other considerations, only the most highly ranked provisional indicator items will be returned as indicator items by the identification process 92 to the list selection process 32.

In step 104, the process 92 ranks the provisional indicator items based on their statistical similarity to the set of source items. To do so, the process 92 calculates a measure called a SimStrength for each provisional indicator item. The SimStrength score is based in part on the commonality index (CI), which is a measure of the degree of similarity between a similar item and a base item, and which is assigned to every similar item in the similar items table 34. In one embodiment, with the two source items of this example, each similar item's SimStrength score is calculated in part as an aggregation of the similar item's commonality index (CI) scores with respect to the two source items from the similar items table 34. In addition, the process 92 adds a bonus to the SimStrength score for the two source items, "UNIX Internals" and "Introduction to Network File System". In this case, the individual SimStrength scores of the two source items would be calculated by adding the bonus to any CI score that the source items might receive for being similar to the other source item.

When the process 92 has calculated a SimStrength score for each provisional indicator item, the process 92 moves on to step 105, where the process 92 ranks the provisional indicator items according to their SimStrength scores. Once the provisional indicator items have been ranked, if the list selection process 32 has requested a certain number N of indicator items, the indicator item identification process 92 can designate the N top-ranked provisional indicator items as indicator items, and the item identification process 92 is complete.

Once the item identification process 92 has identified indicator items, the list selection process 32 from FIG. 5 moves on to step 94 where the process 32 scores and ranks lists in the list repository 30 in order to select those lists that the process 32 identifies as being of the greatest potential interest to the user 12. The process 94 of scoring and ranking lists from the repository 30 is described in greater detail with reference to FIG. 8.

FIG. 8 shows the general sequence of steps for a process 94 to score and rank lists from the lists repository 30 based on the presence of indicator items in the lists and on the relative SimStrength scores of those indicator items. In step 130, the process 94 calculates a ListStrength score for each list. In one embodiment, the ListStrength score for each list is calculated by identifying all indicator items on the list and by adding the SimStrength score for each. When the process has calculated all ListStrength scores in step 130, it moves on to step 132, where the process 94 ranks the lists according to their ListStrength scores. As an optional step, the process can execute step 134, in which the top lists that have already been ranked according to ListStrength scores are re-ranked according to a list effectiveness rating (LER) that expresses the effectiveness of a list to encourage sales of the website's products or to express some other desirable characteristic. The process of step 134 is described in greater detail with reference to FIG. 10. Once the lists have been ranked and, if desired, re-ranked, the top lists can be selected for display in step 96 of the list selection and display process 32.

The list selection process 32 carries out its tasks quickly enough that when the personal welcome page 170 is displayed, the process 32 can include, in a portion of the page 160, a set of selected lists 175 which are assumed to be relevant to the user's 12 current online interests. In the example shown in FIG. 14, the list selection process 32 displays links to five lists, each of which comprises one or more of the indicator items and that are deemed to be relevant to the user's 12 current interests.

FIG. 14 also illustrates one technology for displaying the selected lists. In this example, list information is displayed near the bottom 175 of the welcome page. In FIG. 14, some lists are displayed using the titles, authors, and self-descriptions of the lists, along with graphic images of an item from each list, a link to a full display of each list, and link to more information about the author of each list. Additional lists are displayed below in text form only, including the list title, list author, as well as links to a full display of each list and to more information about the author of each list.

Figure 15:
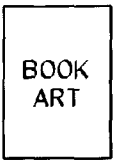
FIG. 15 illustrates the general configuration of a Web page that presents a set of lists to a user who has clicked on a list.

FIG. 15 shows a general form of a page 180 that is displayed when a user 12 selects a link to view a list. Examples of such links are illustrated in the list sections 155, 165, and 175 of FIGS. 12-14. In the example of FIG. 15, a list 182 entitled "Motivational Reading for Downtrodden Gardeners" is displayed in response to a request on the part of the user 12. Because the user 12 chose to view the list, the list selection process 32 can assume that the four items in the selected list 182 are of potential interest to the user 12 and can be used as source items for further list selection.

As described earlier, FIG. 5 illustrates the general sequence of steps that are performed by the list selection process 32, and FIGS. 6 and 8 provide more detail about the steps of various embodiments of the process 32. These figures will now be discussed again with reference to the example shown in FIG. 15. For purposes of brevity, the optional re-ranking process 134 described with reference to FIG. 10 will not be discussed again here, but the re-ranking technologies described in FIG. 10 may be employed in conjunction with the use of list items as source items, as exemplified in FIG. 15.

The list selection process 32 is preferably invoked in response to an online action of a user 12, which, in this case, is selection of a list link that results in the display of a list page. As illustrated by FIG. 5, in the first step 92 of the list selection process 32, the list system 26 identifies one or more indicator items. The process 92 of identifying indicator items for the list selection process 32 is described in greater detail with reference to FIG. 6.

FIG. 6 describes one embodiment of the process 92 to identify indicator items for use by the list selection process 32. Indicator items comprise source items and similar items. Source items are items that are directly associated with the user's current online browsing activity. Similar items are items that the list system 26 retrieves from the similar items table 34 and that the list system 26 deems to be similar to the source items. Together, source items and similar items make up a set of indicator items that can be used by the list selection process 32 to identify lists of potential interest to the user 12.

In the first step 98 of the indicator item identification process 92, the process 92 identifies a set of one or more source items. As described above, source items are items that are directly associated with the user's 12 current online activity or with the user's 12 recent purchase history and are assumed by the list system 26 to be direct indicators of the user's current interests. When a user 12 selects a link to a list, the list selection process 32 identifies the list items as new source items. In the case of the example portrayed in FIG. 15, when a link to the "Motivational Reading for Downtrodden Gardeners" list, then the list selection process 32 identifies the list items of the list, namely the four books shown in FIG. 15, as the current source items.

Once the source items are identified in step 98, the process 92 moves on to step 100 where the process 92 uses the similar items table 34 described earlier to identify a set of similar items for the source items. In step 102, the source item and the set of similar items are joined to form a set of provisional indicator items.

In the remaining steps 104-106 of the process 92, the provisional indicator items will be ranked according to their presumed relevance to the user's current needs, and, if necessary for the sake of processing time, space, or other considerations, only the most highly ranked provisional indicator items will be returned as indicator items by the identification process 92 to the list selection process 32.

In step 104, the process 92 ranks the provisional indicator items based on their statistical similarity to the set of source items. To do so, the process 92 calculates a measure called a SimStrength for each provisional indicator item. The SimStrength score is based in part on the commonality index (CI), which is a measure of the degree of similarity between a similar item and a base item, and which is assigned to every similar item in the similar items table 34. In one embodiment, with the four source items of this example, each similar item's SimStrength score is calculated in part as an aggregation of its commonality index (CI) scores from the similar items table 34. In addition, the process 92 adds a bonus to the SimStrength score for each of the four provisional indicator items that is also a source item. In this case, all four of the source items would receive this bonus, and their individual SimStrength scores would be calculated by adding the bonus to any CI scores the source items receive for being similar to one or more other source items.

When the process 92 has calculated a SimStrength score for each provisional indicator item, the process 92 moves on to step 105, where the process 92 ranks the provisional indicator items according to their SimStrength scores. Once the provisional indicator items have been ranked, if the list selection process 32 has requested a certain number N of indicator items, the indicator item identification process 92 can designate the N top-ranked provisional indicator items as indicator items, and the item identification process 92 is complete.

Once the item identification process 92 has identified indicator items, the list selection process 32 from FIG. 5 moves on to step 94 where the process 32 scores and ranks lists in the list repository 30 in order to select those lists that the process 32 identifies as being of the greatest potential interest to the user 12. The process 94 of scoring and ranking lists from the repository 30 is described in greater detail with reference to FIG. 8.

FIG. 8 shows the general sequence of steps for a process 94 to score and rank lists from the lists repository 30 based on the presence of indicator items in the lists and on the relative SimStrength scores of those indicator items. In step 130, the process 94 calculates a ListStrength score for each list. In one embodiment, the ListStrength score for each list is calculated by identifying all indicator items on the list and by adding the SimStrength score for each. When the process has calculated all ListStrength scores in step 130, it moves on to step 132, where the process 94 ranks the lists according to their ListStrength scores. As an optional step, the process can execute step 134, in which the top lists that have already been ranked according to ListStrength scores are re-ranked according to a list effectiveness rating (LER) that expresses the effectiveness of a list to encourage sales of the website's products or to express some other desirable characteristic. The process of step 134 is described in greater detail with reference to FIG. 10. Once the lists have been ranked and, if desired, re-ranked, the top lists can be selected for display in step 96 of the list selection and display process 32.

The list selection process 32 carries out its tasks quickly enough that when a list page 180 is displayed, the process 32 can include, in a portion of the page 180, a set of selected lists 185 which are assumed to be relevant to the user's 12 current online interests. In the example shown in FIG. 15, the list selection process 32 displays links to four lists, each of which contains one or more items that are included in the "Motivational Reading for Downtrodden Gardeners" list or similar items and are deemed to be relevant to the user's 12 current interests.

The technology for displaying selected lists 185 in FIG. 15 is the same as the technology shown in FIG. 13.

Figure 16:
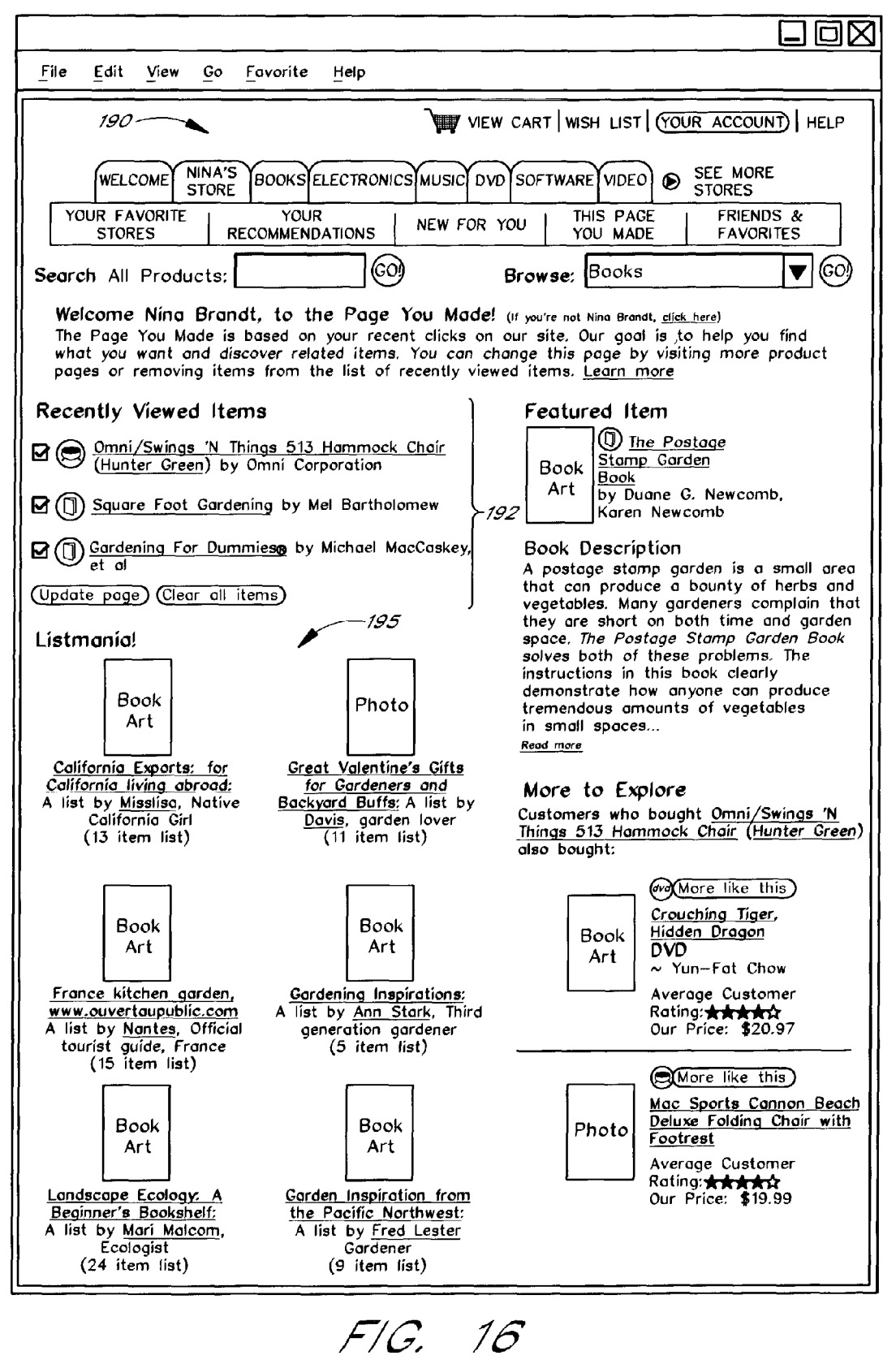

FIG. 16 shows a general form of a page 190 that provides information about the user's viewing activities during the current viewing session, including links to items for which the user 12 chose to view detail pages during the current session. The list selection process 32 infers from the fact that the user chose to view detailed information about given items during the current session that these items 192 are of potential interest to the user 12 and can be used as source items for list selection. Thus, the technology for identifying source items illustrated in FIG. 16 is similar to the technology illustrated in FIG. 12, where lists were displayed to a user 12 upon selection of a link to a detail page. The main difference between the two technologies is the fact that the technology illustrated in FIG. 12 uses a single item as the single source item, whereas the FIG. 16 technology uses all of the items 192 for which the user 12 viewed detail pages during the current viewing session (or a subset thereof) as source items.

FIG. 16 illustrates a technology for displaying selected lists that displays a double column of list listings 195 in the lower left-hand column of the Web page. Each listing comprises the title, author, and self-description for the list, as well as a link for accessing a full display of the list, a graphic image of an item from the list, as well as information regarding the number of items in the list.

Figure 17:
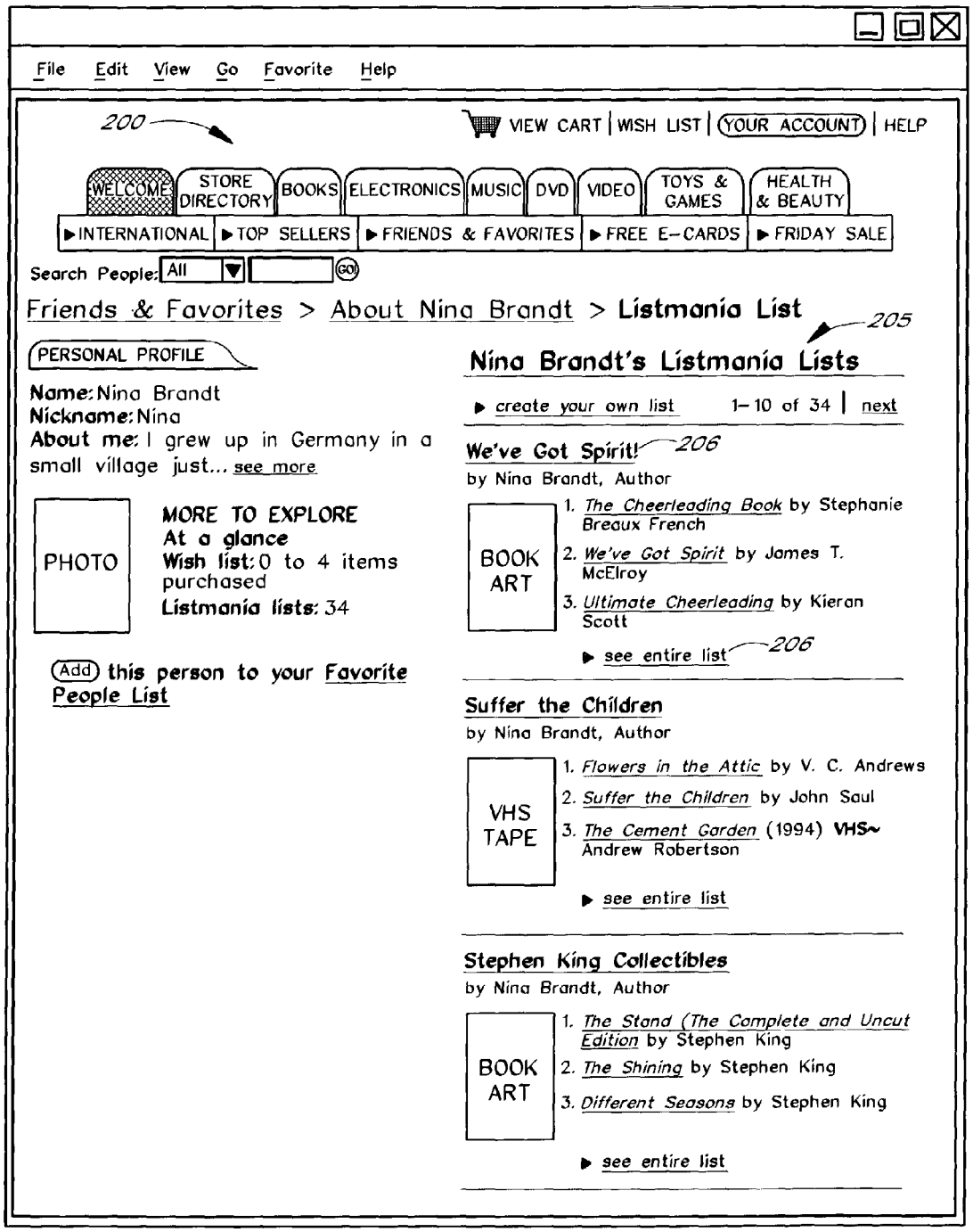
FIG. 17 illustrates the general configuration of a Web page that presents a set of lists to a user who has clicked on a user's personal profile page.

FIG. 17 shows a general form of a personal profile page 200 that can be created for users at websites that offer this service. At such sites, a person's personal profile page 200 can be displayed when a user 12 selects a link associated with that person. The personal profile page 200 can comprise various types of information about the person, including links to all lists that the person has created. In this embodiment, lists are selected for display based on the list-maker of the list rather than on indicator items, SimStrength scores, or ListStrength scores. Thus, this embodiment of the list selection process 32 selects lists by referring directly to the lists repository 30 or user profile database 22 and locating lists created by a given list-maker.

FIG. 17 illustrates a technology for displaying selected lists that displays a single column of listings 205 along the right-hand column of the Web page. Each listing comprises the title, author, and self-description for the list, as well as two links 206 for accessing a full display of the list. Additionally, a graphic image of an item from the list is displayed, as well as a subset of the titles and authors of the list items, with a direct link to the detail pages for the subset of list items.

Although the foregoing list system has been described in terms of certain preferred embodiments, other embodiments will be apparent to those of ordinary skill in the art from the disclosure herein.

The list system as described herein can innovatively encourage users of an online merchant website, to increase their browsing time at the site, to view a wider variety of product descriptions, and to have a more positive attitude towards the site than may have otherwise been the case. However, as has been explained above, the use of an online merchant website as a sample embodiment of the list system is not intended to limit the scope of the list system to similar online business environments or to including only lists whose items are products available for purchase. As described above, the list system can be implemented in embodiments that permit for the creation, selection, and display of lists that comprise items other than products available for purchase. In addition, other embodiments may implement list systems where the lists, rather than being created by users, are created by the merchants, owners, or administrators of the list system themselves, or by their agents. A skilled artisan will recognize from the disclosure herein that many of the aspects of the list system can be implemented in conjunction with business environments that operate via the mail, television connections, telephone connections, or in "brick and mortar" establishments.

In one embodiment, the list system is a component or service of the website in which the lists are displayed, and is provided or controlled by the operator of that website. In another embodiment, the list system is part of a separate metadata service, such as the Alexa Internet service, in which website metadata is displayed to users through a browser plug-in. Specifically, users of the metadata service are given an option, through the browser plug-in and/or a website of the metadata service provider, to create lists of favorite products or other items. These lists are uploaded to a metadata server operated by the metadata service provider. As a user of the metadata service browses the website of a merchant or other entity, information about the items being viewed by the user is reported by the browser plug-in from the user's computer to the metadata server, preferably as described generally in U.S. application Ser. No. 09/820,207, filed Mar. 28, 2001, the disclosure of which is hereby incorporated by reference. This information is in turn used by the metadata server to select lists to display to the user. The selected lists (or links to such lists) are then displayed to the user by the plug-in. With this method, the lists may be presented to users across many different websites of many different merchants or other entities.

As will be recognized by those skilled in the art, the technologies described herein to select and to rank the items designated as indicator items for later use in assessing the relevance of lists are not intended to limit the scope of the list system. Indicator items may be selected from amongst all or part of the source items associated with a given activity taken to indicate user interest. Some or all or none of the similar items associated with said source items may be included in the set of indicator items. Additionally, the list system may be implemented to make use of other items as indicator items. For example, the system may be configured to add items of known popularity or other types of items to the set of indicator items, in addition to items that indicate current user interests, so that they may be considered in the list selection process.

In addition to various embodiments that use a range of different types of items as indicator items, embodiments also exist that implement a variety of technologies for scoring, weighting, or otherwise assessing the usefulness of indicator items to the list selection process. As described above, when similar items are to be included in the set of indicator items, then a variety of metrics for assessing item similarity may be used. Additionally, when similar items are to be included in the set of indicator items, then various embodiments can implement systems that use all identified similar items for each source item, or a fixed number of similar items per source item, or a variable number of similar items per source item, or a random sampling of similar items.

Indicator items can be assessed based on their SimStrength scores, as calculated in the description above, or according to some other formula, such as one that gives bonuses to indicator items which are identified as being similar to multiple source items, or one that gives equal weight to every source item and similar item. Alternatively, indicator items can be selected based on their similarity to one another or lack thereof, thus enabling the system to select a set of indicator items that represent the greatest diversity or that represent the greatest concentration of similarity. As will be recognized by a skilled artisan, these and other embodiments of a formula or other technology for assessing the relative desirability of items for use in selecting lists for display all fall within the spirit of the list system.

Embodiments also exist that allow for a variety of technologies to assess the relevance of lists and to select a subset of the list repository's lists for display. For example, in addition to the technologies described above for re-ranking a set of relevant lists according to their measured "effectiveness" to encourage purchases, technologies exist to display lists that, for example, individually or as a group, exhibit the greatest or the smallest degree of diversity in the items they include. Additionally, in a system implemented in an environment where users have the ability to designate a set of other users as their "favorites" or as some other designation, the degree of similarity between a candidate list and a list created by a "favorite" person may be factored in to the list's assessment. These and other technologies to select a set of lists for display to users all fall within the spirit of the list system.

In other embodiments of the invention, other types of technologies or sources of information could be used to identify the items of known interest. For example, in a service used to provide lists of websites, the items (websites) known to be of interest to a user could be identified by parsing a Web server access log and/or by extracting URLs from the "favorite places" list of the user's Web browser. In a service used to provide lists of restaurants, the items (restaurants) of known interest could be identified by parsing the user's credit card records to identify restaurants that were visited more than once.

The list system provides technologies that select lists for display to a viewer based on one or more of the following: (a) the presence or absence of the source items in a given list, (b) the presence or absence of items that are similar to the source items in a given list, (c) the number of these items in a given list, (d) the strength of the similarity between the list items and the source items, (e) other indicators of the desirableness of displaying a given list, or (f) other measures.

A skilled artisan will recognize that, in addition to the above-mentioned examples of technologies for identifying source items and similar items as a basis for selecting relevant lists to display, other technologies can be used for identifying indicator items without departing from the spirit of the invention.

What is claimed is:

1. A computer-implemented method for assisting users in locating items represented within a data repository, the method comprising:

maintaining a database of user-created lists of selected items from the data repository, wherein at least a first user generates one or more user-created lists by selecting the items for inclusion in the user-created lists, and wherein the first user further associates user-defined titles with the user-created lists;

allowing the first user to submit the user-created lists and the associated user-defined titles for storage in the data repository so as to allow the first user to share the user-created lists with other users wherein the other users can view the items in the user-created lists and the user-defined titles associated with the user-created lists;

ranking at least one of the user-created lists relative to other user-created lists based in part on the effectiveness of the user-created lists;

monitoring results of a search query submitted by at least a second user during a browsing session of the data repository;

selecting at least one user-created list from the user-created lists based at least in part on the search query results and based at least in part on the ranking of the user-created lists; and presenting at least a portion of the selected user-created lists to the second user.

2. The computer-implemented method of claim 1, wherein monitoring the results to a search query submitted by the second user further comprises identifying at least one item that exemplifies a user interest.

3. The computer-implemented method of claim 1, wherein selecting the user-created lists further comprises referring to stored information about similarities between the items in the data repository to aid in predicting user-created lists of interest to the second user.

4. The computer-implemented method of claim 1, wherein the effectiveness of the user-created lists is based in part on actions of other users who accessed the user-created lists.

5. The computer-implemented method of claim 1, wherein presenting at least a portion of the user-created lists to the second user comprises presenting a portion of top-ranking user-created list to the second user.

6. The computer-implemented method of claim 1, wherein suggesting at least one of the user-created lists to the second user comprises presenting the user-created list along with a graphic representation of at least one of the items in the user-created list.

7. A computer-implemented information retrieval method that allows users of a data repository to generate lists of related items from the repository and that, in response to receiving results from a search query submitted by a user, recommends related items to the user based on the lists, the information retrieval method comprising:

allowing at least a first user to generate one or more user-created lists of items wherein the user generates the user-created lists by selecting items for inclusion in the lists and wherein the user further associates user-defined titles with the user-created lists;

allowing the first user to submit the user-created lists and the user-defined titles to share the user-created lists with other users;

ranking at least one of the user-created lists relative to other user-created lists based at least in part on the effectiveness of the user-created lists;

receiving search query results from a query submitted to a search engine by a second user wherein the search query results identify at least one item; and recommending related items to the second user by selectively presenting at least a portion of one or more of the user-created lists to the second user based at least in part on the search query results and based at least in part on the ranking of the user-created lists.

8. The computer-implemented information retrieval method of claim 7, further comprising selecting user-created lists to present to the user based on the similarity of the items in the user-created lists to the at least one item in the search query results.

9. The computer-implemented information retrieval method of claim 7, further comprising referring to stored information about statistical similarities between items when selecting the user-created lists for presentation to the second user.

10. The computer-implemented information retrieval method of claim 7, further comprising ranking the user-created lists for presentation based on an assessment of the user-created lists' effectiveness in encouraging a desired behavior on the part of the second user.

11. The computer-implemented information retrieval method of claim 7, wherein the user-created list can comprise, in addition to the user-created list items, at least one of:

a name for the user who generated the user-created list;

commentary regarding the user who generated the user-created list;

commentary for at least one user-created list item; and opinions regarding at least one user-created list item.

12. A computer-implemented information retrieval system comprising:

means for allowing at least a first user to generate one or more user-created lists of offerings wherein the first user generates the user-created lists by selecting items for inclusion in the user-created lists and wherein the first user further associates user-defined titles with the user-created lists;

means for allowing the first user to submit the user-created lists and the associated user-defined titles for sharing the user-created lists with other users;

means for ranking at least one of the user-created lists relative to other user-created lists based at least in part on the effectiveness of the user-created lists;

means for monitoring results from a second user's search engine query; and means for selecting the user-created lists based at least in part on the results from the second user's search engine query and based at least in part on the ranking of the user-created lists.

13. The information retrieval system of claim 12, wherein the means for monitoring the results from the second user's search engine query further comprises means for interpreting an offering included in the search engine query results as exemplifying the interest.

14. The information retrieval system of claim 12 wherein the means for identifying the user-created lists related to the interest comprises means for referring to stored information about user-created lists that are statistically similar.

15. The information retrieval system of claim 12 further comprising means for ranking the identified user-created lists based at least in part on their historical ability to encourage a given behavior in users who view the user-created lists.

16. A computer-implemented system that assists users in locating items represented within a data repository, the system comprising:

a database of user-created lists of items selected from the data repository, wherein at least a first user generates one or more of the user-created lists by selecting the items for inclusion in the user-created lists, wherein the first user further associates user-defined titles with the user-created lists, and wherein the first user submits the user-created lists and the associated user-defined titles for storage in the database;

a first component configured to enable a second user to submit queries to a search engine with respect to the data repository;

a second component configured to monitor the results of a search query submitted by the second user; and a third component configured to select at least one user-created list from the database, based at least in part on the results of the search query submitted by the second user, wherein the third component is configured to rank at least one of the user-created lists relative to other user-created lists based at least in part on the effectiveness of the user-created lists and wherein the effectiveness of the user-created lists is determined at least in part by actions of other users who accessed the user-created lists, and wherein the third component is further configured to suggest the user-created lists to the second user by presenting a portion of a top-ranking user-created list to the second user to assist the second user in locating items of interest.

17. The computer-implemented system of claim 16, wherein the third component is further configured to select the user-created list based, at least in part, on stored information regarding statistical similarities amongst items in the data repository.

18. The computer-implemented system of claim 16 wherein the third component is further configured to select the user-created list based, at least in part, on stored information regarding the ability of the user-created lists in the database to encourage a given behavior in users who view the user-created lists.

19. The computer-implemented system of claim 16 wherein users communicate with at least one of the first component, the second component, and the third component by using a networked connection.

20. A computer-implemented method implemented in a browser plug-in that identifies lists of related items, the method comprising:

allowing users to generate user-created lists by selecting the items for inclusion in the user-created lists, and wherein the users further associate user-defined titles with the user-created lists;

allowing the users to submit the user-created lists and the associated user-defined titles to share the user-created lists with other users;

ranking at least one of the user-created lists of items relative to other user-created lists based at least in part on the effectiveness of the user-created lists;

monitoring with a browser plug-in results associated with a user's search engine query; and suggesting at least a portion of the user-created lists based at least in part on the results associated with the search engine query and based at least in part on the ranking of the user-created lists.

21. The computer-implemented method of claim 20, wherein identifying a user interest further comprises interpreting an item included in the query results as exemplifying the user interest.

22. The computer-implemented method of claim 21, further comprising selecting user-created lists to suggest to the user based on the statistical similarity of the items in the user-created lists to the exemplifying item.

23. The computer-implemented method of claim 21, wherein suggesting user-created lists of items further comprises taking into consideration information regarding the effectiveness of the user-created lists to encourage a given user behavior.

* * * * *